US012737955B2

(12) United States Patent
Dow et al.

(10) Patent No.: US 12,737,955 B2
(45) Date of Patent: Sep. 15, 2026

(54) RIGID BODY SIMULATION BY RELATIVE SLEEPING

(71) Applicant: Roblox Corporation, San Mateo, CA (US)

(72) Inventors: Eric Dow, San Mateo, CA (US); Maciej Mizerski, Kelowna (CA); Sheldon Paul Andrews, Hudson (CA)

(73) Assignee: Roblox Corporation, San Mateo, CA (US)

( * ) Notice: Subject to any disclaimer, the term of this patent is extended or adjusted under 35 U.S.C. 154(b) by 201 days.

(21) Appl. No.: 18/388,493

(22) Filed: Nov. 9, 2023

(65) Prior Publication Data

US 2025/0061638 A1 Feb. 20, 2025

Related U.S. Application Data

(60) Provisional application No. 63/533,560, filed on Aug. 18, 2023.

(51) Int. Cl.
*G06T 19/00* (2011.01)
*G06T 13/20* (2011.01)
*G06T 13/40* (2011.01)

(52) U.S. Cl.
CPC .............. *G06T 13/40* (2013.01); *G06T 13/20* (2013.01); *G06T 19/00* (2013.01)

(58) Field of Classification Search
CPC ................................................ G06T 13/20–40
See application file for complete search history.

(56) References Cited

U.S. PATENT DOCUMENTS

2025/0298940 A1* 9/2025 Storey ..................... G06F 30/20

OTHER PUBLICATIONS

Cline, et al., “Post-stabilization for rigid body simulation with contact and constraints”, 2003 IEEE International Conference on Robotics and Automation (Cat. No. 03CH37422), vol. 3, IEEE, 2003, 8 pages.
Coevoet, et al., “Adaptive merging for rigid body simulation”, ACM Transactions on Graphics (TOG) 39.4, Jul. 2020, 13 pages.

* cited by examiner

*Primary Examiner* — Ryan McCulley
(74) *Attorney, Agent, or Firm* — IP Spring

(57) ABSTRACT

Some implementations relate to methods, systems, and computer-readable media for determining updated states of rigid body objects. In some implementations, the method includes receiving a model representation of rigid body objects, receiving an input state of the rigid body objects, determining that a relative velocity meets a threshold velocity, responsive to determining that a first rigid body object and a second rigid body object are in contact and that the relative velocity meets the threshold velocity, constructing a merged representation that represents the first rigid body object and the second rigid body object, applying a solver based on the input state and the merged representation to obtain an updated state for the first rigid body object and the second rigid body object, and causing the first rigid body object and the second rigid body object in the updated state to be displayed within a virtual environment.

29 Claims, 8 Drawing Sheets

RIGID BODY SIMULATION BY RELATIVE SLEEPING

CROSS-REFERENCE TO RELATED APPLICATIONS

This application claims the benefit of priority to U.S. Provisional Patent Application No. 63/533,560, filed on Aug. 18, 2023 and titled RIGID BODY SIMULATION BY RELATIVE SLEEPING, the entire contents of which are hereby incorporated by reference herein.

TECHNICAL FIELD

Implementations relate generally to computer-based virtual experiences, and more particularly, to methods, systems, and computer readable media to simulate motion of rigid body objects within a virtual environment that incorporates relative sleeping of rigid body objects.

BACKGROUND

Some online platforms (e.g., metaverse platforms, virtual experience platforms, virtual immersion platforms, virtual reality platforms, gaming platforms, media exchange platforms, etc.), allow users to connect with each other, interact with each other (e.g., within a virtual environment), create games and other virtual immersive experiences, and share information with each other via the Internet. Users of online virtual platforms may participate in multiplayer gaming environments or virtual environments (e.g., three dimensional environments), design custom gaming environments and immersive experiences, design characters, design mechanisms, exchange virtual items/objects with other users, communicate with other users sing audio or text messaging, and so forth. Users may interact with objects within the virtual environment, and simulation of the objects may be performed within the virtual environment.

Simulation of objects (e.g., rigid body objects) within the virtual environment may utilize a physics engine and/or a physics solver to determine a current state of one or more objects, which may then be displayed on one or more user devices(s).

Some implementations were conceived in light of the above.

SUMMARY

A system of one or more computers can be configured to perform particular operations or actions by virtue of having software, firmware, hardware, one or more computer systems connected by a network, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to display a plurality of rigid body objects within a virtual environment. The computer-implemented method also includes receiving a model representation of the plurality of rigid body objects, where the plurality of rigid body objects may include at least a first rigid body object and a second rigid body object; receiving an input state of the plurality of rigid body objects represented by the model representation; determining that the first rigid body object and the second rigid body object are in contact; determining that a relative velocity between the first rigid body object and the second rigid body object meets a threshold velocity; responsive to determining that the first rigid body object and second rigid body object are in contact and that the relative velocity between the first rigid body object and the second rigid body object meets the threshold velocity, constructing a merged representation that represents the first rigid body object and the second rigid body object; applying a solver based on the input state and the merged representation to obtain an updated state for the first rigid body object and the second rigid body object, where the updated state includes at least one of: an updated position, an updated orientation, or an updated velocity for the first rigid body object and the second rigid body object; and causing the first rigid body object and the second rigid body object in the updated state to be displayed within the virtual environment. Other embodiments of this aspect include corresponding computer systems, apparatus, and computer programs recorded on one or more computer storage devices, each configured to perform the actions of the methods.

Implementations may include one or more of the following features. The computer-implemented method where the plurality of rigid body objects further may include a third rigid body object, and where the method further may include: determining whether the third rigid body object is in contact with the first rigid body object; if it is determined that the first rigid body object and the third rigid body object are in contact, determining whether a relative velocity of the first rigid body object and the third rigid body object meets the threshold velocity; responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and third rigid body object are in contact and that the relative velocity of the first rigid body object and the third rigid body object meets the threshold velocity, constructing the merged representation that represents the first rigid body object, the second rigid body object, and the third rigid body object. The contact state may include a set of contact points between the first rigid body object and the second rigid body object; and determining whether a tangential velocity for each contact point meets a threshold tangential velocity; and responsive to determining that the first rigid body object and the second rigid body object are in contact, that the relative velocity meets the threshold velocity, and that the tangential velocity of each contact point meets the threshold tangential velocity, constructing the merged representation. Determining whether the first rigid body object and the second rigid body object are in contact further may include determining at least one constraint between the first rigid body object and the second rigid body object. The computer-implemented method may include: determining whether one or more external forces acting on the merged representation overcomes an internal force between the first rigid body object and the second rigid body object; and responsive to a determination that the one or more external forces overcomes the internal force, separating the merged representation into an unmerged representation that represents the first rigid body object and the second rigid body object, and applying the solver based on the input state and the unmerged representation to obtain the updated state for the first rigid body object and the second rigid body object. The computer-implemented method may include: determining a constraint matrix based on a relation between the relative velocity between the first rigid body object, the second rigid body object, and the at least one constraint; storing, at a time of constructing the merged representation that represents the first rigid body object and the second rigid body object, the constraint matrix in a cache memory; retrieving, subsequent to a time of separation of the merged representation into the unmerged representation that represents the first rigid body object and the second rigid body object, the constraint matrix from the cache memory; and applying the solver based on the input state, the constraint matrix, and the unmerged representation to determine a state of relative motion between the first rigid body object and the second rigid body object. The computer-implemented method may include providing a regularization function to determine a stable internal force between the first rigid body object and the second rigid body object. The computer-implemented method may include storing the regularization function applied to the internal force in a cache memory and retrieving the regularization function from the cache memory for determining the updated state of the merged representation. The computer-implemented method may include providing the regularization function to determine the updated state of the merged representation. The model representation of each rigid body object is a mesh, and where determining that the first rigid body object and the second rigid body object are in contact may include determining a state of the first rigid body object and the second rigid body object with reference to surfaces of the mesh. Determining that the relative velocity between the first rigid body object and the second rigid body object meets a threshold velocity further may include providing an oriented bounding box (OBB) to determine an upper bound of a fastest point of relative motion between the first rigid body object and the second rigid body object. Determining that the first rigid body object and the second rigid body object are in contact may include determining that the first rigid body object and the second rigid body object are in a state of direct contact. Determining that the first rigid body object and the second rigid body object are in contact may include determining that the first rigid body object and the second rigid body object share a constraint. Applying the solver is performed at a first computer node, and where the method further may include: receiving, at a second computer node and from the first computer node, an indication at a first time that the first rigid body object and the second rigid body object are included in a merged representation, where the indication includes a relative position and orientation of the first rigid body object and the second rigid body object; receiving, at the second computer node and from the first computer node, at a subsequent time, an updated consolidated state of the first rigid body object and the second rigid body object, where the updated consolidated state includes a relative position and orientation of a consolidated object that is representative of both the first rigid body object and the second rigid body object; determining, at the second computer node, an updated position of each of the first rigid body object and the second rigid body object based on the relative position and orientation of the first rigid body object and the second rigid body object at the first time, and the updated consolidated state; and causing the first rigid body object and the second rigid body object in the updated state to be displayed at the second computer node. Implementations of the described techniques may include hardware, a method or process, or computer software on a computer-accessible medium.

One general aspect includes a system that includes a memory with instructions stored thereon; and a processing device, coupled to the memory, the processing device configured to access the memory and execute the instructions, where the instructions cause the processing device to perform operations that may include: receiving a model representation of a plurality of rigid body objects, where the plurality of rigid body objects may include at least a first rigid body object and a second rigid body object; receiving an input state of the plurality of rigid body objects represented by the model representation; determining that the first rigid body object and the second rigid body object are in contact; determining that a relative velocity between the first rigid body object and the second rigid body object meets a threshold velocity; responsive to determining that the first rigid body object and second rigid body object are in contact and that the relative velocity between the first rigid body object and the second rigid body object meets the threshold velocity, constructing a merged representation that represents the first rigid body object and the second rigid body object; applying a solver based on the input state and the merged representation to obtain an updated state for the first rigid body object and the second rigid body object, where the updated state includes at least one of: an updated position, an updated orientation, or an updated velocity for the first rigid body object and the second rigid body object; and causing the first rigid body object and the second rigid body object in the updated state to be displayed within a virtual environment. Other embodiments of this aspect include corresponding computer systems, apparatus, and computer programs recorded on one or more computer storage devices, each configured to perform the actions of the methods.

Implementations may include the system where the plurality of rigid body objects further may include a third rigid body object, and where the operations further may include: determining whether the third rigid body object is in contact with the first rigid body object; if it is determined that the first rigid body object and the third rigid body object are in contact, determining whether a relative velocity of the first rigid body object and the third rigid body object meets the threshold velocity; responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and third rigid body object are in contact and that the relative velocity of the first rigid body object and the third rigid body object meets the threshold velocity, constructing the merged representation that represents the first rigid body object, the second rigid body object, and the third rigid body object. The operations further may include: responsive to a determination that the first rigid body object and the second rigid body object are in contact, determining a contact state between the first rigid body object and the second rigid body object, where the contact state may include a set of contact points between the first rigid body object and the second rigid body object; and determining whether a tangential velocity for each contact point meets a threshold tangential velocity; and responsive to determining that the first rigid body object and the second rigid body object are in contact, that the relative velocity meets the threshold velocity, and that the tangential velocity of each contact point meets the threshold tangential velocity, constructing the merged representation. Determining whether the first rigid body object and the second rigid body object are in contact further may include determining at least one constraint between the first rigid body object and the second rigid body object. The model representation of each rigid body object is a mesh, and where determining that the first rigid body object and the second rigid body object are in contact may include determining a state of the first rigid body object and the second rigid body object with reference to surfaces of the mesh. Determining that the first rigid body object and the second rigid body object are in contact may include determining that the first rigid body object and the second rigid body object are in a state of direct contact. Determining that the first rigid body object and the second rigid body object are in contact may include determining that the first rigid body object and the second rigid body object are connected by a constraint. Applying the solver is performed at a first computer node, and where the operations further may include: receiving, at a second computer node and from the first computer node, an indication at a first time that the first rigid body object and the second rigid body object are included in a merged representation, where the indication includes a relative position and orientation of each of the first rigid body object and the second rigid body object; receiving, at the second computer node and from the first computer node, at a subsequent time, an updated consolidated state of the first rigid body object and the second rigid body object, where the updated consolidated state includes a relative position and orientation of a consolidated object that is representative of both the first rigid body object and the second rigid body object; determining, at the second computer node, an updated position of each of the first rigid body object and the second rigid body object based on the relative position and orientation of each of the first rigid body object and the second rigid body object at the first time and the updated consolidated state; and causing the first rigid body object and the second rigid body object in the updated state to be displayed within a virtual environment at the second computer node. Implementations of the described techniques may include hardware, a method or process, or computer software on a computer-accessible medium.

One general aspect includes a non-transitory computer-readable medium that may include instructions that responsive to execution by a processing device, causes the processing device to perform operations that may include receiving a model representation of a plurality of rigid body objects, where the plurality of rigid body objects may include at least a first rigid body object and a second rigid body object; receiving an input state of the plurality of rigid body objects represented by the model representation; determining that the first rigid body object and the second rigid body object are in contact; determining that a relative velocity between the first rigid body object and the second rigid body object meets a threshold velocity; responsive to determining that the first rigid body object and second rigid body object are in contact and that the relative velocity between the first rigid body object and the second rigid body object meets the threshold velocity, constructing a merged representation that represents the first rigid body object and the second rigid body object; applying a solver based on the input state and the merged representation to obtain an updated state for the first rigid body object and the second rigid body object, where the updated state includes at least one of: an updated position, an updated orientation, or an updated velocity for the first rigid body object and the second rigid body object; and causing the first rigid body object and the second rigid body object in the updated state to be displayed within a virtual environment. Other embodiments of this aspect include corresponding computer systems, apparatus, and computer programs recorded on one or more computer storage devices, each configured to perform the actions of the methods.

Implementations may include the non-transitory computer-readable medium where the plurality of rigid body objects further may include a third rigid body object, and where the operations further may include: determining whether the third rigid body object is in contact with the first rigid body object; if it is determined that the first rigid body object and the third rigid body object are in contact, determining whether a relative velocity of the first rigid body object and the third rigid body object meets the threshold velocity; responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and third rigid body object are in contact and that the relative velocity of the first rigid body object and the third rigid body object meets the threshold velocity, constructing the merged representation that represents the first rigid body object, the second rigid body object, and the third rigid body object. Determining whether the first rigid body object and the second rigid body object are in contact further may include determining at least one constraint between the first rigid body object and the second rigid body object. Determining that the relative velocity between the first rigid body object and the second rigid body object meets a threshold velocity further may include providing an oriented bounding box (OBB) to determine an upper bound of a fastest point of relative motion between the first rigid body object and the second rigid body object. Determining that the first rigid body object and the second rigid body object are in contact may include determining that the first rigid body object and the second rigid body object are in a state of direct contact. Determining that the first rigid body object and the second rigid body object are in contact may include determining that the first rigid body object and the second rigid body object share a constraint. Applying the solver is performed at a first computer node, and where the operations further may include: receiving, at a second computer node and from the first computer node, an indication at a first time that the first rigid body object and the second rigid body object are included in a merged representation, where the indication includes a relative position and orientation of each of the first rigid body object and the second rigid body object; receiving, at the second computer node and from the first computer node, at a subsequent time, an updated consolidated state of the first rigid body object and the second rigid body object, where the updated consolidated state includes a relative position and orientation of a consolidated object that is representative of both the first rigid body object and the second rigid body object; determining, at the second computer node, an updated position of each of the first rigid body object and the second rigid body object based on the relative position and orientation of each of the first rigid body object and the second rigid body object at the first time and the updated consolidated state; and causing the first rigid body object and the second rigid body object in the updated state to be displayed within a virtual environment at the second computer node. Implementations of the described techniques may include hardware, a method or process, or computer software on a computer-accessible medium.

DETAILED DESCRIPTION

Figure 1:
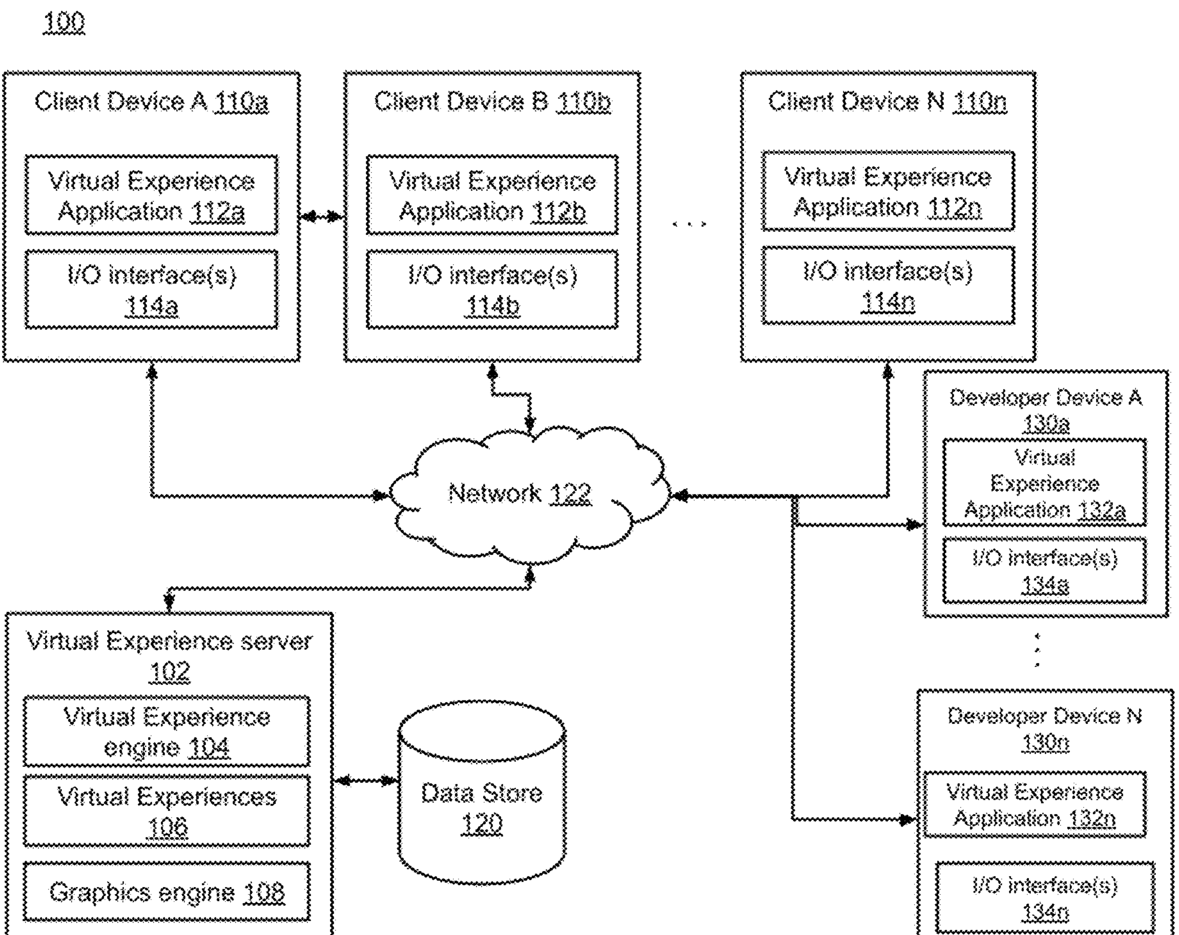
FIG. 1 is a diagram of an example system architecture for simulation of rigid body objects, in accordance with some implementations.

The disclosure describes improvements to the performance of physics engines that simulate the motion of rigid body objects. In some implementations, the physics engines may integrate the equations of motion of a collection of rigid body objects that interact via collisions and constraints (e.g., contact constraints, hinges, ball-sockets, etc.) to determine the position and velocities of rigid body objects as a function of time. Accordingly, the computational expense of said simulations may scale with the number of rigid body objects and collisions and/or constraints in the system.

For example, simulating motion of 1000 rigid body objects may be more computationally expensive than simulating the motion of 10 rigid body objects. Further, as another example, simulating motion of 2 rigid body objects that are connected via a constraint may be more computationally expensive than simulating 2 rigid body objects that are not connected by a constraint. Further, as another example, simulating motion of 2 rigid body objects that collide with each other may be more computationally expensive than simulating motion of 2 rigid body objects that do not collide with each other.

One way to reduce computational expense of rigid body simulation for rigid body objects within a virtual environment may be to reduce the number of rigid body objects within the virtual environment for which the physics solver may solve equations of motion for. Accordingly, fewer rigid body objects within a virtual environment may lead to fewer equations of motions being input to the physics solver.

Another way to reduce the computational expense of rigid body simulation for rigid body objects within a virtual environment may be to reduce the number of constraints between rigid body objects. Accordingly, fewer constraints between rigid body objects within a virtual environment may lead to fewer constraint functions to be input to the physics solver to satisfy.

Another way to reduce the computational expense of rigid body simulation for rigid body objects within a virtual environment may be to reduce the number of collision detections performed between rigid body objects. Accordingly, fewer collision detections may lead to fewer collision detection calculations being input to the physics solver.

The above mentioned problem regarding the computational expense of simulating rigid body objects may be solved at least in part by implementing a method of optimizing rigid body simulation using relative sleeping (e.g., adaptive merging of rigid bodies), as described in greater detail in accordance with some implementations disclosed herein.

In a simulated environment that includes multiple rigid body objects in contact with each other, the motion of each body is based on external forces and the contacts that exist between each body. Determination of contacts between bodies, and the forces produced at said contacts, are both computationally expensive steps of a rigid body simulation. One objective is to reduce the number of contacts between rigid bodies via the relative sleeping method disclosed, thus reducing the computational expense associated with determining contacts between bodies and the forces produced at those contacts.

In many scenarios, computational effort may be utilized to simulate bodies that are comoving, e.g., are moving together within a simulated environment. As an illustrative example, the following scenario is considered: simulating a container ship with multiple stacked containers resting on the deck of the container ship. Accordingly, if the motion of the container ship is such that there are no external forces that perturb the containers so as to overcome the frictional forces between the containers and/or between the containers and the deck of the container ship, the containers will likely move (travel) with the ship with identical linear and/or angular velocity.

Further, since the initial configuration of the container ship system may be known, the positions of all containers may be derived from the position of the ship, and thus simulating each individual container may lead to expenditure of unnecessary computational effort.

Since the computational budget afforded to the physics engine in real-time simulation environments may be limited, the equations of motion may be solved approximately. As a result, numerical errors may accumulate in the positions and velocities of the simulated rigid body objects that are determined. In accordance with the container ship example previously mentioned, the numerical errors may manifest themselves as "drift" in the positions of the containers relative to their starting locations on the deck of the ship. It is considered that over a period of time, this drift may accumulate, and may result in a simulated result of the containers sliding off the deck of the ship.

Additionally, in a physics engine (e.g., a rigid body dynamics engine), rigid bodies may be put to sleep when their velocity meets (e.g., is below) a threshold, and awakened as needed, e.g., when it is involved in an interaction such a detected collision with another body. By putting the rigid bodies to sleep, computational work of the physics engine may be reduced since the position/velocity of sleeping bodies are not updated when they are in a state of sleep.

In some implementations, the concept of putting rigid bodies to sleep may be applied such that a set of rigid bodies that are put to sleep relative to one another. For example, if a collection of rigid bodies is moving together, all but one of the rigid bodies can be put to sleep and the position/velocity of the single (consolidated) body that represents the collection of rigid bodies may be determined and updated to reflect the state of all the rigid bodies in the collection of rigid bodies.

Techniques of this disclosure may be utilized to reduce the computational expense of simulating a plurality of rigid bodies. The computational expense of simulating a plurality of rigid body objects is reduced by "merging" two or more rigid body objects together for the solver, based on certain conditions that are met, and that are described in greater detail in accordance with some implementations. Accordingly, in scenarios where a plurality of rigid body objects that are connected by a contact and/or a constraint are comoving, the computational expense of simulating the motion of said plurality of rigid body objects may be reduced by merging the rigid body objects together, and calculating the motion of the merged rigid body object rather than each individual rigid body object. Inside the physics engine, the plurality of individual rigid body objects may be replaced by a single "merged" rigid body object that includes mass and inertia properties determined based on a merged body formed by the combination of the plurality of individual rigid body objects. The position and velocity of the single merged rigid body object may be evolved by the simulator, and the positions and velocities of the composite rigid body objects may be derived from the position and velocity of the merged rigid body and the relative position of each individual body within the collection.

Since the computational expense of simulation may scale with the total number of rigid body objects in the system, merging rigid body objects may provide significant speedup to the solve stage of the physics pipeline.

Collision detection processes that are undertaken as part of a physics solver may also benefit from merging rigid body objects, at least in part because bodies within the same merged collection may not need to be tested for collision.

Further, computation of forces between contact points, e.g., contact forces, may not need to be performed for bodies within the same merged collection. For example, two individual rigid body objects that are in contact with each other may include 4 contact points between each other, thereby ordinarily necessitating determination (computation) of the contact force between each of the 4 contact points shared between the two individual rigid body objects. However, upon merging the individual rigid body objects, thereby forming a merged rigid body object, the computation of the contact forces between the two previously individual rigid body objects that are now a part of the same merged collection, may no longer be necessary. Accordingly, merging individual rigid body objects to form merged rigid body objects may result in fewer total contact points associated with rigid body objects within the virtual environment.

In some implementations, the method of optimizing rigid body simulation using relative sleeping may generally include: determining whether rigid body objects are connected by a contact and/or a constraint, determining whether said rigid body objects are comoving, and upon a determination that said rigid body objects are connected by a contact and/or a constraint and that said rigid body objects are comoving, merging the rigid body objects into a merged rigid body object with the mass and inertia properties associated with the combined collection of rigid body objects prior to merging. Further, in some implementations, determining whether to merge rigid body objects that are connected by a contact and/or a constraint may be based on the relative velocity of the rigid body objects.

As used throughout the present disclosure, the term "collection of rigid body objects" refers to a plurality of rigid body objects existing in a virtual environment. Accordingly, a collection of rigid body objects may include individual rigid body objects, merged rigid body objects, and/or any combination of individual rigid body objects and merged rigid body objects. The terms "collection of rigid body objects" and "system of rigid body objects" may be used interchangeably.

As used throughout the present disclosure, the term "individual rigid body object" refers to a rigid body object that is not part of a merged collection of rigid body objects.

Further, as used throughout the present disclosure, the term "merged collection" refers to a plurality of rigid body objects that have been merged together. Further, it is to be understood that the terms "merged collection" and "merged rigid body object" may be used interchangeably.

Further, as used throughout the present disclosure, the term "unmerged collection" refers to a previously merged collection of rigid body objects, wherein at least one of the rigid body objects are no longer merged together, so that the unmerged collection may include individual rigid body objects. Further, in some scenarios, the unmerged collection may likewise include separate merged collections, such as a first merged collection and a second merged collection, wherein the first merged collection is not merged with the second merged collection. Accordingly, an unmerged collection may include individual rigid body objects, merged rigid body objects, and/or any combination of individual rigid body objects and merged rigid body objects.

As used throughout the present disclosure, the term "model representation of a plurality of rigid body objects" refers to a representative model of a corresponding plurality of rigid body objects. As used throughout the present disclosure, the term "merged representation" refers to a representative model of a plurality of rigid body objects that includes a merged rigid body object.

FIG. 1 is a diagram of an example system architecture for simulation of rigid body objects, in accordance with the present disclosure.

FIG. 1 is a diagram of an example system architecture for simulation of rigid body objects, in accordance with some implementations. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIGS. 4-5. A client device 110 can include a virtual experience application 112, and input/output (I/O) interfaces 114 (e.g., input/output devices). The input/output devices can include one or more of a microphone, speakers, headphones, display device, mouse, keyboard, controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a web site (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience players, virtual experience session data may include associated metadata, e.g., virtual experience identifier(s); device data associated with the players; demographic information of the player(s); virtual experience session identifier(s); chat transcripts; session start time, session end time, and session duration for each player; relative locations of participant avatar(s) within a virtual experience environment; virtual purchase(s) by one or more player(s); accessories utilized by players; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different virtual experience sessions of a virtual experience may be stored in data store 120.

In some implementations, chat transcripts may be stored in the form of conversations between participants based on the timestamps. In some implementations, the chat transcripts may be stored based on the originator of the message (s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user.

In some implementations, online virtual experience server 102 may be a virtual server. For example, the virtual server may provide single-player or multiplayer virtual experiences to a community of users that may access or interact with virtual experiences using client devices 110 via network 122. In some implementations, virtual experiences may be two-dimensional (2D) games, three-dimensional (3D) games (e.g., 3D user-generated games), virtual reality (VR) experiences, or augmented reality (AR) experiences, for example. In some implementations, users may participate in virtual experience with other users. In some implementations, a virtual experience may be interacted with in real-time with other participants of the virtual experience.

In some implementations, interaction may refer to the interaction of one or more players using client devices (e.g., 110) within a virtual experience (e.g., 106) or the presentation of the interaction on a display or other output device (e.g., 114) of a client device 110.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 share the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "objects" or "virtual item(s) or "virtual objects" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual objects, user information, video, images, commands, media item, etc.) associated with online virtual experience server 102 or virtual experience applications. In some implementations, virtual objects (e.g., also referred to as "item(s)" or "objects" or "virtual objects" or "virtual item(s)" herein) may refer to objects that are used, created, shared or otherwise depicted in virtual experience applications 106 of the online virtual experience server 102 or virtual experience applications 112 of the client devices 110. For example, virtual objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine, a collision response engine, sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience conditions. For example, if the number of users participating in a particular virtual experience 106 exceeds a threshold number, the online virtual experience server 102 may perform one or more virtual experience engine functions that were previously performed by the client devices 110.

For example, users may be interacting in a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send simulation instructions (e.g., position and velocity information of the characters participating in the group interaction or commands, such as rendering commands, collision commands, etc.) to the client devices 110 based on control instructions. For instance, the online virtual experience server 102 may perform one or more logical operations (e.g., using virtual experience engine 104) on the control instructions to generate simulation instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the simulation instructions and render the virtual experience for presentation on the displays of client devices 110.

In some implementations, the control instructions may refer to instructions that are indicative of actions within a virtual experience of a user's character. For example, control instructions may include user input to control the action within the virtual experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates interaction instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, interaction instructions may refer to instructions that enable a client device 110 to render a virtual experience, such as a multiplayer virtual experience. The interaction instructions may include one or more of user input (e.g., control instructions), character position and velocity information, or commands (e.g., physics commands, rendering commands, collision commands, etc.).

In some implementations, characters (or virtual objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users with access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual object (e.g., body parts, etc.) but the user may control the character (without the character virtual object) to facilitate the user's interaction with the virtual experience (e.g., a puzzle game where there is no rendered character virtual object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual objects, virtual experiences 106, or virtual environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, a gaming program, a virtual experience program, a VR program, an AR program, etc.) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, a virtual experience program, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or interact with virtual experiences 106 hosted by online virtual experience server 102). As such, the virtual experience application may be provided to the client device (s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

An online virtual environment platform may also allow users (developers) of the platform to create new objects and/or mechanisms. For example, users of the online virtual environment platform may be enabled to create, design, and/or customize new objects such as vehicles, tools, toys, and make them available to other users.

The online virtual environment platform may provide tools to support simulation of objects and mechanisms within a virtual environment. In some implementations, a physics engine and/or physics solver may be utilized for the simulation of objects.

Some objects and/or parameters within a virtual environment may be such that the complexity of simulating the objects and environment may be computationally expensive to enable the simulation to meet time requirements for real-time simulation and rendering of the object. For example, an updated state of objects may have to be determined within a time period that meets requirements for a particular frame refresh rate of a display device where the updated state of objects is displayed to a user. Failure to meet the time requirement can lead to jittery updates, leading to a poor visual experience for the user.

An objective of a virtual environment platform owner or administrator is superior user experience for its users. A technical problem for online virtual environment platform operators is accurate, timely, and computationally efficient determination of object states within a virtual environment.

Some online virtual environments may restrict the types of objects that are permitted to be utilized on the online virtual environment platform, and/or may utilize physics engines and physics solvers that are tailored to the particular types of objects. It may be beneficial for online virtual environment platforms to permit a broader variety of objects and users may be encouraged to design and introduce complex mechanisms that may include multiple rigid body objects that are associated with multiple constraints. Physics solvers that provide satisfactory simulation results for some objects can fail to do so, for other complex objects and/or mechanisms. In some cases, conventional physics solvers may encounter instabilities, causing the objects to explode, disappear, or exhibit other behaviors that are unnatural or impossible under the rules defined for the virtual environment, e.g., gravity or other factors within the virtual environment etc.

Implementations are described herein to simulate motion of rigid body objects on an online virtual environment platform. Further, the implementations may offer performance that is linear in scale to a number of constraints that are associated with the rigid body virtual objects.

In some implementations, memory allocation is performed based on a structure of the matrices associated with the system(s) of equations that govern simulated objects, which can further improve runtime performance.

Figure 2:
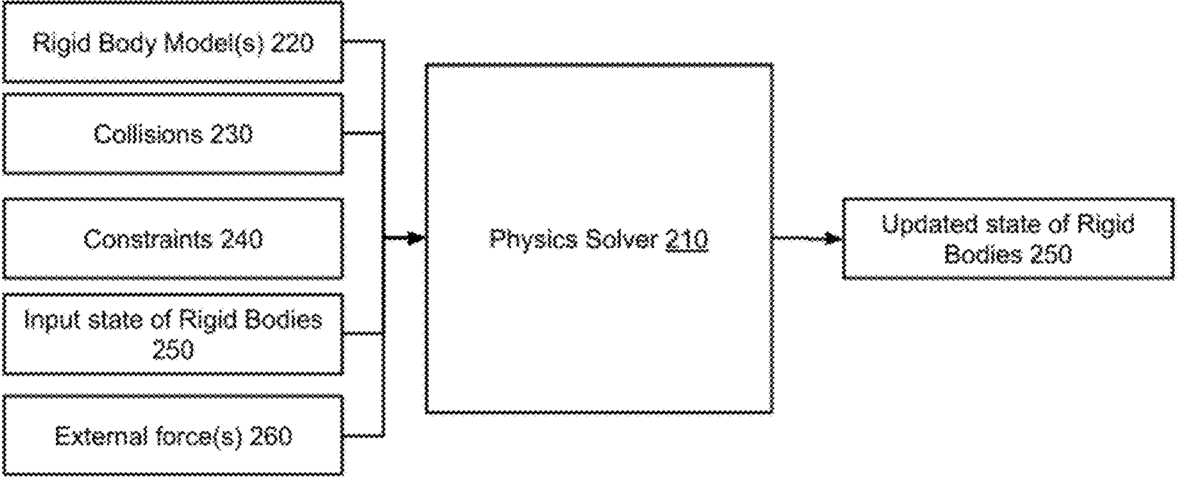
FIG. 2 depicts an example physics solver utilized to simulate motion of rigid body objects, in accordance with some implementations.

FIG. 2 depicts an example physics engine including a physics solver utilized to simulate motion of rigid body objects, in accordance with some implementations. In general, utilization of a physics engine for simulation of rigid body objects includes two primary stages: a collision detection stage, and a collision resolution stage. Accordingly, the collision detection stage determines a collision between a pair of objects, and the collision resolution stage determines the correct physical response for the objects, e.g., updating positions and velocities, and determining that the constraints between objects are met. The physics solver may be utilized responsible for the collision resolution stage.

As stated above, a physics engine may include a physics solver that is utilized to determine an updated state of objects within the virtual environment. An output of a physics engine and/or physics solver may be utilized to display an updated state of one or more objects within the virtual environment. Enabling real-time updates of motion of objects within a virtual environment may be enabled by a computationally efficient physics solver that can accurately determine an updated state within time limits imposed for such computation(s). Additionally, the physics solver is implemented to account for various types of possible objects designed by users and still not be susceptible to instabilities, e.g., wherein underlying algorithms within the physics solver do not converge due to a particular type of rigid body object designed and provided by a user. A physics engine and/or physics solver can improve computational performance across devices in the online virtual environment platform while also providing a better user experience, e.g., by displays where objects in the virtual environment move smoothly without jitters, etc.

FIG. 2 depicts an example physics solver utilized to simulate motion of rigid body objects, in accordance with some implementations. The example physics solver may be utilized by an online virtual experience platform to simulate motion of constrained rigid body objects (rigid bodies) and mechanisms under the influence of forces in a virtual environment.

A rigid body object is an idealized approximation to a solid body in which deformation is zero or negligible. The distance between points on a rigid body remains constant in time regardless of external forces or moments exerted on it.

The physics solver 210 may be utilized within a physics engine to track and render motion of rigid bodies that may be part of a virtual experience in the virtual environment, and to determine the effects of forces such as gravity, collisions between bodies, etc., on a rigid body as the virtual experience proceeds from one update period and/or display frame to the next.

In some implementations, a display frame rate may be determined by a processor, e.g., a graphics card and refers to a number of frames a system is able to produce in a second. A refresh rate may be based on a rate at which a monitor is able to completely refresh its display. The physics solver may operate at a rate based on an update period that may be different from the display frame rate and the refresh rate. In some implementations, the update period may be determined by an update period that is needed to meet a threshold accuracy and/or stability of mathematical solutions that govern the motion of a rigid body.

The physics solver may be implemented as part of virtual experience server 102 and may be included within a virtual experience engine 104 and/or graphics engine 108. In some implementations, a physics solver may be included within a physics engine.

In some implementations, the physics solver may be implemented within one or more client devices 110 or one or more developer devices 130. In some implementations, functionality of a physics solver may be implemented across one or more devices, e.g., between virtual experience server 102, client device 110, or developer device 130.

As depicted in FIG. 2, the physics solver takes as inputs rigid body object model(s) representation 220, collision data 230 associated with the rigid body objects, constraints 240 imposed on the rigid body objects, an input state 250 of the rigid body objects, and external forces 240 acting on the rigid body objects. In some implementations, one or more of these inputs may not be utilized (e.g., collision data 230) under certain situations (e.g., when objects don't undergo collisions). In some implementations, additional inputs can be provided to physics solver 210. The physics solver generates as output an updated state 270 of the rigid body objects, based on the combined effect on the inputs described earlier.

In some implementations, the rigid body object model representation is a representative model of a corresponding rigid body object and may include information about the rigid body, e.g., shape, dimension, material properties, etc. In some implementations, the rigid body model representation may include additional information that pertains to body physics, e.g., moment of inertia, center of gravity, center of mass, etc.

Collision data is obtained by collision detection, which may be implemented within a physics engine, e.g., as a module. Collisions between rigid body objects within a virtual environment are detected based on intersections between geometries associated with the rigid body objects. Collision data such as collision points, normals, penetration depths, etc., are generated by a collision detector.

Constraints are restrictions on the motion of rigid body objects that may be provided by the user as part of the model representation of a rigid body object. Examples of constraints include joints (such as ball joints, hinge joints), etc., and non-penetration constraints.

An input state of the rigid body object to the solver may either be an initial state, e.g., at the start/commencement of a simulation, or a previous rigid body object state from a previously determined state. For example, an input state may be an initial state of a vehicle in a virtual environment, just before the vehicle starts moving.

Inputs to the physics solver also include external force(s) that act on the rigid body object within the virtual environment, e.g., a gravitational force that is acting on a falling rigid body object. The external force(s) may be a default setting within the environment, user defined settings, or a combination. For example, a specified horsepower of a vehicle and an input setting provided by a user (e.g., using a game stick or remote) may be utilized to derive a force acting on a vehicle based on generated engine power. Similarly, a user may specify a gravity-free setting for a virtual environment, which results in simulation of a gravity-free virtual environment, e.g., gravitational forces would not be applied on the rigid body object.

Based on provided inputs, the physics solver determines an updated state of the rigid body object(s) by solving for the motion of rigid bodies under the influence of various provided inputs.

The updated state of the rigid body object(s) is determined by the physics solver by applying the laws of physics as defined within the virtual environment, such as conservation of energy and momentum, to the rigid body object(s). An exact determination, however, can be prohibitively expensive, real-time simulation of rigid body object motion is performed by the user of approximate techniques. This enables suitable performance, e.g., by completion of simulation within a provided time window, while providing physically realistic results. In an online virtual environment, an objective is to maintain adherence to the basic laws of motion within a reasonable tolerance.

One approximation technique utilized is to discretize the motion of the rigid body object using time-stepping. The equations of motion of constrained and unconstrained rigid body objects can be difficult to integrate directly and accurately. The discretization subdivides the motion into small time increments, wherein the equations are simplified and linearized, thereby enabling an approximate solution. During each time step, the motion of the relevant parts of rigid bodies that are associated with a constraint is linearly approximated. The physics solver is utilized to solve the linearized equations of motion for a time step to obtain an updated state of a rigid body object.

In some implementations, an iterative method may be utilized to solve the linear equations of motion, wherein with each iteration, an approximate solution for an updated state of the rigid body object is obtained, that is brought closer to a true solution. A final accuracy of a solution may be based on a number of iterations performed by the physics solver.

Figure 3:
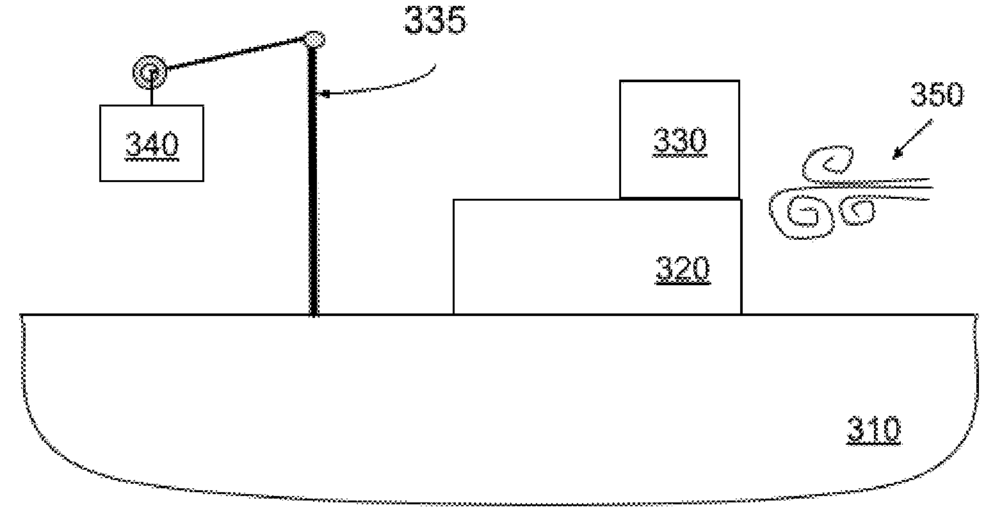
FIG. 3 depicts a plurality of rigid body objects in a virtual environment, in accordance with some implementations.

FIG. 3 depicts a plurality of rigid body objects in a virtual environment, in accordance with some implementations. More particularly, FIG. 3 depicts an example implementation of a simulated container ship with a plurality of containers placed on the deck of the container ship and another container that is attached to an articulated crane that is positioned on the container ship, within a virtual environment.

As mentioned above, if the motion of the ship does not meet (e.g., exceed) a particular threshold state of motion, and there are no external forces so as to overcome an internal force between a pair of containers and/or between a container and the container ship, then the containers will likely move with the ship with identical linear and angular velocity.

Since the initial configuration of the container ship system is known, the positions of all containers on the ship may be derived from the position of the ship and the relative position of the containers when compared to the ship. Accordingly, it may be unnecessary and a waste of computational effort to determine the movement of each individual container on the ship, as opposed to determining the movement of a single merged rigid body object representing an aggregate of the ship and the containers.

With continued reference to FIG. 3, a container ship 310 is shown with a first container 320 resting on top of the container ship 310, and a second container 330 resting on top of the first container 320. FIG. 3 additionally depicts a third container 340 attached to an articulated crane 335. The articulated crane 335 is attached to the container ship.

For the purposes of simulation of the objects, the container ship 310 may be merged with the first container 320 based on the contact state and the relative velocity between the ship 310 and the first container 320. In a similar manner, the first container 320 may be merged with the second container 330 based on the contact state and the relative velocity between the first container 320 and the second container 330.

In a scenario where the container ship 310 is merged with the first container 320, the merged representation representing the combination of the container ship 310 and first container 320 may be evolved by the physics solver as a single merged rigid body object, rather than as two separate rigid body objects.

In a similar manner, in a scenario where the first container 320 is merged with the second container 330, the merged representation representing the composite first container 320 and the second container 330 may be evolved by the physics solver as a single merged rigid body object, rather than as two separate rigid body objects.

Further, in a scenario where the ship 310 and the first container 320 have already been merged together, the second container 330 may be merged with that previously merged rigid body, and a new merged representation representing the composite ship 310, first container 320, and second container 330 may be evolved by the physics solver as a single merged rigid body object, rather than as separate rigid body objects. Any number of rigid body objects may be merged together. Further, a merged rigid body object may be additionally merged with additional rigid body objects and/or other merged rigid body objects.

Similarly, based on the contact state and the relative velocity between third container 340 and container ship 310, which share a common constraint in articulated crane 335, third container 340 and container ship 310 may also be put in a state of relative sleeping by merging third container 340 and container ship 310 together.

Further, in the container ship scenario depicted by FIG. 3, a contact constraint exists between the ship 310 and the first container 320, and between the first container 320 and the second container 330. Ordinarily, in a scenario where the ship 310 and the containers 320 and 330 are each individual rigid body objects that have not been merged prior to being evolved by the physics solver, the motion of the ship 310, the first container 320 and the second container 330 that would be evolved by the physics solver would include utilization of a constraint function to ensure that the constraints e.g., the contact constraints, are satisfied. In contrast, once the ship and containers are merged, it may be unnecessary to re-calculate the constraints functions to satisfy the constraints, because the motion of the merged representation is evolved as a single rigid body object, rather than as individual bodies that have constraints between them. Accordingly, rather than determining the linear and/or rotational movement of individual rigid body objects with respect to the constraints existing between the objects, the physics solver solves for the linear and/or rotational movement of one rigid body object. Since constraints connect rigid body objects to other rigid body objects, there are no constraints that need to be satisfied for a single rigid body object. Accordingly, in a virtual environment that includes a plurality of rigid body objects, there may be fewer constraints to satisfy when some of the rigid body objects of the plurality of rigid body objects merge to form one or more merged rigid body objects.

In certain scenarios, the merged representation may be caused to unmerge. Accordingly, in some implementations, external forces acting on the merged collection can cause the merged collection to unmerge. For example, with reference to FIG. 3, a scenario can exist where an object collides with either storage container 320 or storage container 330. In said scenario, the merged collection may unmerge prior to updating the position, orientation, and/or velocity of each storage container. With continued reference to FIG. 3, unmerging may be performed in other scenarios besides those involving collisions, such as a scenario where the ship 310 is tipping over, causing the containers 320 and 330 to slide relative to the ship 310.

Other scenarios may exist where it may be desirable to unmerge a merged collection of rigid body objects, prior to applying a physics solver. The scenarios may include scenarios where an external force acting on the merged collection overcomes an internal force (e.g., a contact force, a constraint force) between a pair of rigid body objects, thus causing a physical separation of the rigid body objects. With continued reference to FIG. 3, this may be exemplified in a scenario where an external force acting on the merge collection overcomes an internal force between the ship 310 and the first container 320, and/or where the external force overcomes the internal force between the first container 320 and the second container 330. In some implementations, the internal forces can include a normal force and a friction force.

In FIG. 3, wind 350 is depicted as an external force that may act on a merged rigid body object. If the force of the wind 350 on any of the containers, e.g., the first container, is greater than the friction forces acting between the container ship 310 and the first container 320, then the first container 320 may separate from the ship under the action of the wind force(s). In such a scenario, the first container 320 may have to be unmerged from the ship 310. Likewise, if the force of the wind 350 is greater than the friction between the first container 320 and the second container 330, then the second container 330 may have to be unmerged from the first container 320.

As another illustrative example, the following scenario is considered: a dock crane (not shown) lifting one of the stacked containers from the deck of the ship. In this scenario, the crane hook provides a force on the container sufficient to produce relative motion between the container and the ship. In said scenario, the container may be unmerged from the ship and treated as a separate rigid body object.

The internal forces may change as the merged collection is acted upon by external forces, even in scenarios where certain rigid body objects do not move relative to each other. Since friction is dependent upon the weight acting between two surfaces, a greater mass can cause greater friction between two rigid body objects. For example, in a scenario where a crane removes the second container 330 from the first container 320, the internal force between the ship 310 and the first container 320 decreases. As a complimentary example, in a scenario where a crane places a third container (not shown) on top of the second container 330, the internal force between the first container 320 and the ship 310 increases.

Figure 4A:
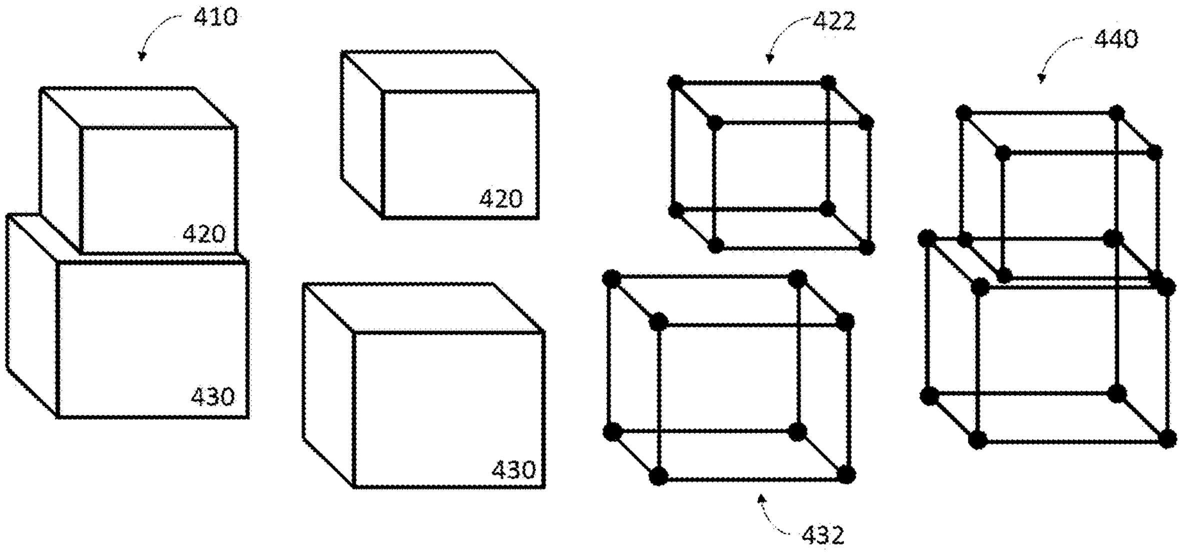
FIG. 4A depicts an element exploded view of an example plurality of rigid body objects, in accordance with some implementations.
Figure 4B:
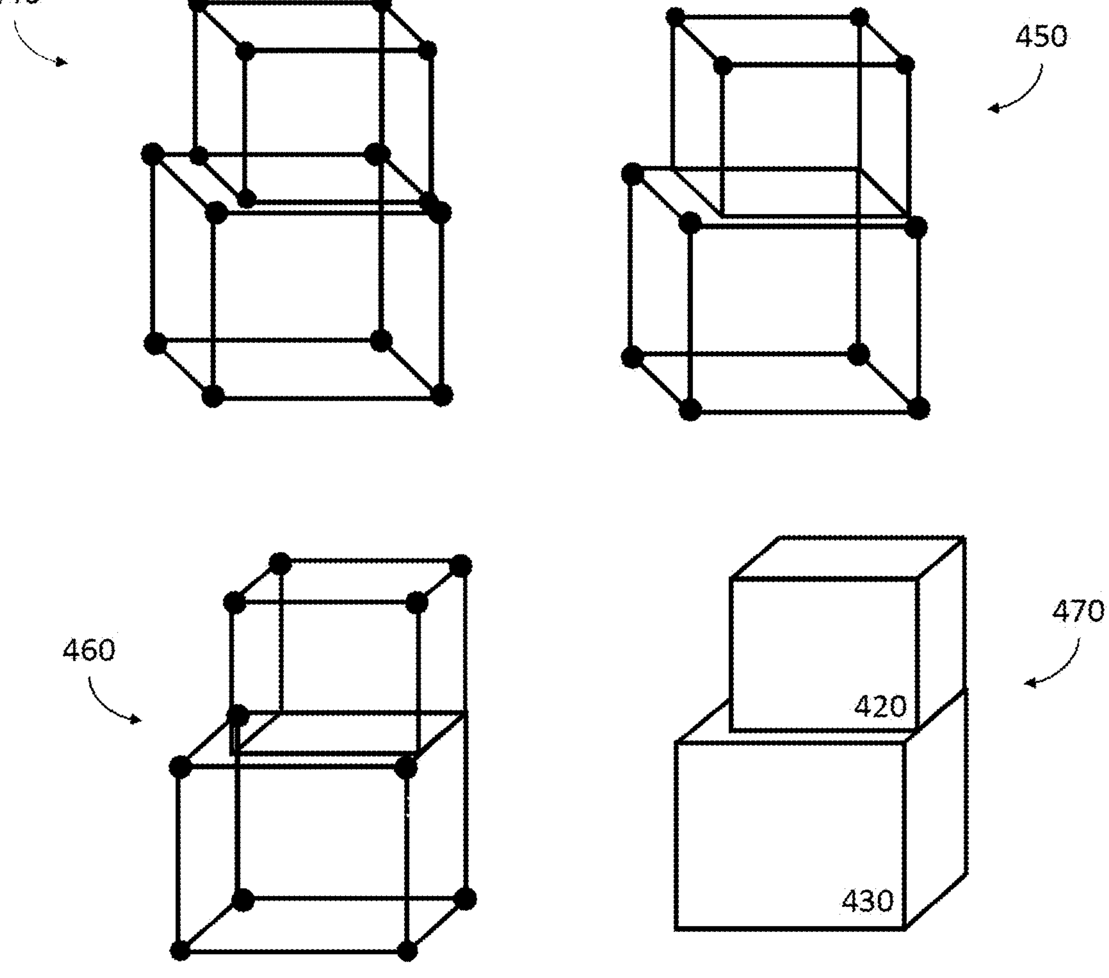
FIG. 4B depicts an example of a merged representation of a plurality of rigid body objects, in accordance with some implementations.

FIG. 4A and FIG. 4B depict example rigid body objects and merged representations of rigid body objects, in accordance with some implementations. A merged representation may be a plurality of objects, e.g., virtual objects within a virtual environment, that may include objects that have been merged together to form a single "merged" object for calculation purposes by the physics engine. The merged representation may include a plurality of rigid body objects that are merged together based on their contact state and relative velocities, as described in greater detail throughout the present disclosure.

FIG. 4A depicts an element exploded view of an example plurality of rigid body objects, in accordance with some implementations. FIG. 4B further depicts model representations of said rigid body objects, in accordance with some implementations. A model representation may be a virtual representation of a rigid body object, e.g., a mesh diagram with vertices and edges depicting the rigid body object.

In FIG. 4A, the plurality of rigid body objects 410 is depicted with a first rigid body object 420 sitting on top a second rigid body object 430. Further, rigid body objects 420 and 430 are also shown independently to show that the objects are separate objects from each other.

FIG. 4A depicts model representations 422 and 432 of rigid body objects 420 and 430, respectively. Accordingly, model representation 422 is a model representation of the first rigid body object 420, while model representation 432 is a model representation of the second rigid body object 430.

FIG. 4A also depicts a model representation of a plurality of rigid body objects 440, in accordance with some implementations. Accordingly, model representation 440 is a model representation of the plurality of rigid body objects 410. Further accordingly, the model representation 440 includes model representation 422 representing an individual first rigid body object 420 and model representation 432 representing an individual second rigid object 430.

FIG. 4B depicts an example of a merged representation of a plurality of rigid body objects, in accordance with some implementations. Accordingly, based on a determination that two or more objects are in contact with each other and meet a threshold relative velocity, those two or more objects may be merged together to form a merged rigid body object. For the processes (purposes) of the physics engine, the collection of rigid body objects 440 may be replaced by a single merged rigid body object 450 with the same mass and inertia properties as the combined collection of rigid body objects 440. The position and velocity of this single merged rigid body object 450 may be evolved by the simulator, and the positions and velocities of its composite body objects 420 and 430 may be derived from the position and velocity of the merged rigid body object 450 and the relative position of each individual body object 420 and 430 within the collection of rigid body objects 440.

With continued reference to FIG. 4B, merged representation 460 representing the first and second rigid body objects (420 and 430) in the updated state is shown. Accordingly, the computational expense of simulating the motion of the merged representation may be less than it would have been to simulate updates to each of the rigid body objects separately. The collection of rigid body objects 470 is depicted as simulated in the virtual environment, with first rigid body object 420 and the second rigid body object 430 in the updated state with an updated orientation.

In some implementations, determining whether a rigid body object should be unmerged from a merged collection of rigid body objects may include determining the internal forces between all of the rigid body objects that are a part of the merged collection. In some implementations, the internal forces may change and accordingly may be updated whenever the merged collection is acted upon by external forces, even in scenarios where rigid body objects do not move relative to one another.

Figure 5:
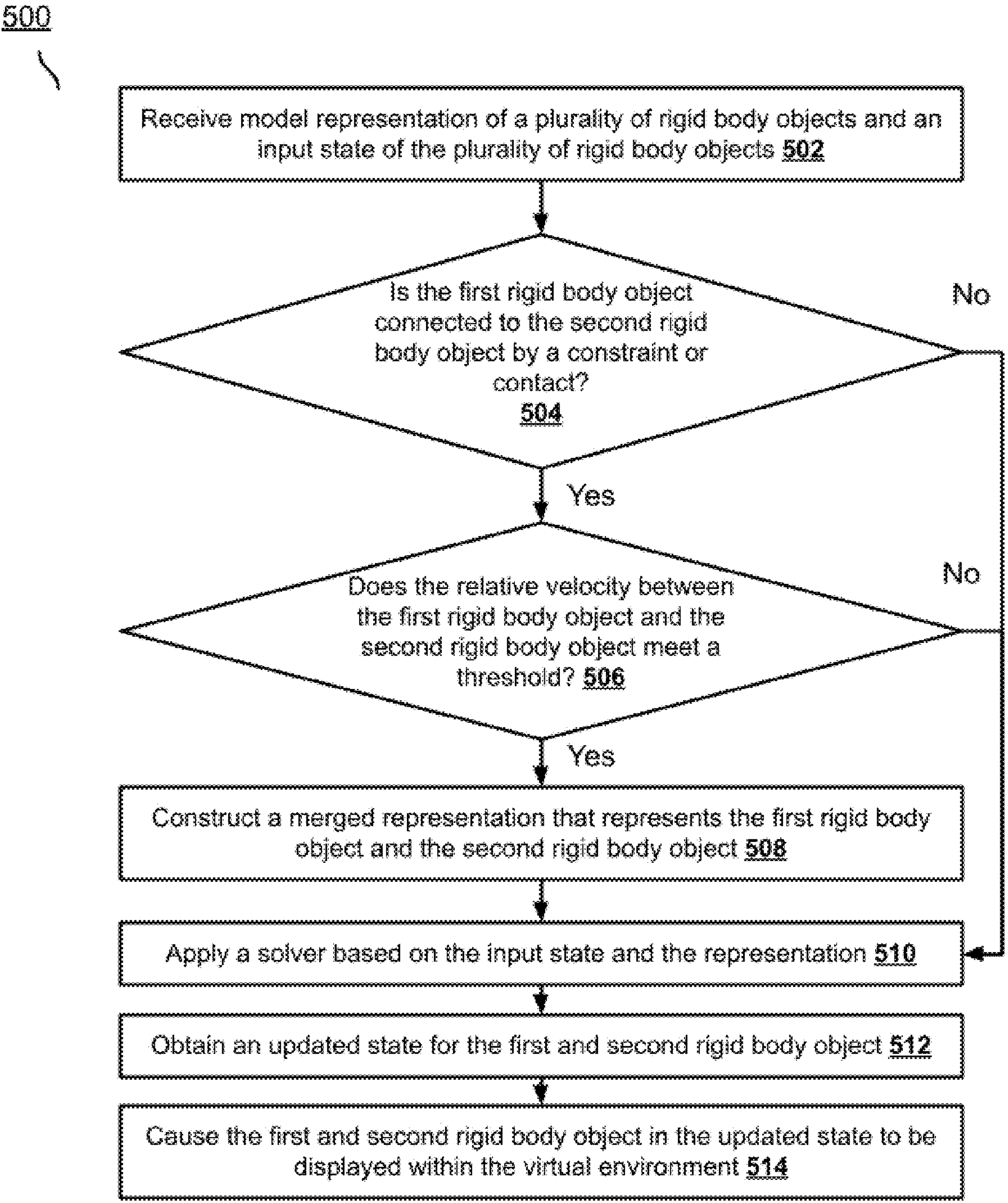
FIG. 5 is a flowchart illustrating an example method to simulate and/or display rigid body objects within a virtual environment, in accordance with some implementations.

FIG. 5 is a flowchart illustrating an example method 500 to simulate and/or display a rigid body object within a virtual environment, in accordance with some implementations. Further, the method 500 may be used to accomplish relative sleeping of rigid objects. In some implementations, method 500 can be implemented, for example, on a virtual experience server 102 described with reference to FIG. 1. In some implementations, some or all of the method 500 can be implemented on one or more client devices 110 as shown in FIG. 1, on one or more developer devices 130, or on one or more server devices(s) 102, and/or or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 500. In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device. Method 500 may begin at block 502.

At block 502, model representation(s) of each of a plurality of rigid body objects and an associated input state of the plurality of rigid body objects is received. The plurality of rigid body objects may include a first rigid body object and a second rigid body object. In some implementations, the plurality of rigid body objects may include additional rigid body objects. In some implementations, the plurality of rigid body objects may comprise any number of rigid body objects. In some implementations, the model representation may include a model, e.g., two dimensional (2) or three-dimensional (3D) models of a rigid body object that describes the rigid body object. Further, the input state of the plurality of rigid body objects may include a position, an orientation, and/or a velocity of the rigid body objects.

In some implementations, receiving the model representation may include receiving a model of a rigid body object that describes the rigid body object and one or more constraint functions that characterize connectivity between the rigid body object and one or more constraints of the plurality of constraints. Further, the one or more constraint functions may ensure that rigid bodies maintain a certain distance apart and/or a certain relative orientation to each other. Accordingly, the one or more constraint functions can be utilized to adjust the orientation and/or position of an object in order to satisfy the plurality of constraints. It is understood that the purpose of a constraint function is to add forces to rigid body objects in order to enable determination of a state that satisfies that constraint. Accordingly, a constraint function determines the linear and/or angular constraint force that is to be applied to a rigid body object.

Block 502 may be followed by block 504. At block 504, it may be determined whether the first body object is in contact with the second body object. Based on a determination that the first body object and the second body objects are in contact, block 504 is followed by block 506; else block 504 is followed by block 510.

In some implementations, it is determined whether the first body object is in contact with the second rigid body object during the collision detection stage of the physics solver.

Determination of whether the first rigid body object is in contact with the second rigid body object may include determination of whether the first rigid body object and the second rigid body object are in direct contact and/or in indirect contact. In some implementations, direct contact can include scenarios where the geometry representing the first rigid body object and the geometry representing the second rigid body intersect. This intersection may occur at a collection of points, edges or surfaces For example, direct contact may refer to scenarios where the first rigid body object and the second rigid body object are in direct contact such that they share one or more points, edges, or surfaces. Indirect contact may refer to scenarios where the first rigid body object and the second rigid body object share one or more constraint(s), e.g., a hinge, a beam, other connector or structure that connects the first rigid body object and the second rigid body object.

For example, with reference to FIG. 3, container 320 and container 330 are in contact (direct contact) with each other since they share a common surface while container 320 is in direct contact with container ship 310 by virtue of container 320 and container ship 310 sharing a common surface. Container 340 is in contact (indirect contact) with container ship 310 by virtue of sharing a common constraint, articulated crane 335. In this illustrative example, container 320, container 330, and container 340 are all in contact with container ship 310.

In some implementations, the determination that the first body object is in contact with the second rigid body object is based on a distance between the first body object and the second rigid body object. For example, the determination that two bodies are in contact may be based on a determination that the distance between the first rigid body object and the second body object is 0, or approximately 0. In some implementations, the determination that two bodies are in contact is determined with reference to surfaces of the first rigid body object and the second rigid body object. More specifically, in said implementation, the determination that two bodies are in contact is determined when at least a portion of the surface of the first rigid body object is touching or intersecting a portion of the surface of the second rigid body object. In some implementations, a contact manifold may be determined between two rigid body objects that includes a collection of points, edges, and surfaces.

In some implementations, a set of contact points is determined upon a determination that the first rigid body object is in contact with the second rigid body object. In some implementations, the set of contact points is determined during a collision detection stage of the physics solver.

In some implementations, the set of contact points includes 4 contact points between the first rigid body object and the second rigid body object.

In some implementations, an internal force is determined between the first rigid body object and the second rigid body object. In some implementations, a set of internal forces are determined with respect to each contact point of the set of contact points.

In some implementations, a contact state is determined between the first and second rigid body object. In some implementations, the contact state comprises the set of contact points between the first and second rigid body object, and the internal forces for each of the contact points of the set of contact points.

In some implementations, the model representation of the first rigid body object and second rigid body may further include a constraint between the first rigid body object and the second rigid body object. A constraint is understood as any restriction imposed on the motion of a body.

The degrees of freedom of a rigid body object characterize the number of possible independent movements of a rigid body. An unrestrained rigid body in space includes six degrees of freedom: three translating motions along the x, y, and z axes, and three rotational motions around the x, y, and z axes, respectively. Accordingly, the six degrees of freedom include the x, y, and z axis positions, and the rotations around the x, y, and z axes.

A constraint limits and/or removes degrees of freedom from a rigid body. Accordingly, a constraint is a condition that limits the movement of two bodies relative to each other, and accordingly, restricts the degrees of movement of a body relative to another body. When the degrees of freedom are limited in accordance with the specific constraint imposed on the bodies relative to each other, the constraint is considered satisfied.

In some implementations, the constraint is a holonomic constraint. In other embodiments, the constraint is a non-holonomic constraint. It is understood that holonomic constraints are constraints on the degrees of freedom of an object, while non-holonomic constraints are constraints on the velocity of an object. It is understood that a contact constraint is a type of non-holonomic constraint.

In some implementations, the constraint is a contact constraint (also referred to as a “non-penetration” constraint). A contact constraint (or non-penetration constraint) ensures that bodies cannot move through each other. Further, contact constraints may ensure that velocity of colliding bodies is partially reflected to create a bouncing behavior. With reference to FIG. 3, a contact constraint between the ship 310 and the first container 320 prevents the first container 320 from going through the surface of the ship 310. With continued reference to FIG. 3, a contact constraint between the first container 320 and the second container 330 prevents the second container 330 from going through the surface of the first container 320.

In some implementations, the constraint is a joint constraint, including but not limited to, a ball-and-socket joint, a revolute joint (pin joint), a hinge joint, etc.

At block 506, a relative velocity between the first rigid body object and second rigid body object is compared to a threshold velocity. Based on the determination that the relative velocity meets the threshold velocity, block 506 is followed by block 508; else block 506 is followed by block 510. In some embodiments, the input state of the plurality of rigid body objects includes a first velocity of the first rigid body object, and a second velocity of the second rigid body object. In said implementation, the first velocity of the first rigid body object may be compared to the second velocity of the second rigid body object in order to obtain a relative velocity between the first rigid body object and the second rigid body object.

In some other implementations, the threshold velocity is approximately 0. In some implementations, the threshold velocity may be based on a residual error specified for the solver. In some implementations, the threshold velocity is a non-zero value that is small relative to velocities of the various rigid bodies with respect to a stationary reference frame. In some implementations, the threshold velocity is zero (0).

In some implementations, determination of the relative velocity between the first rigid body object and the second rigid body object includes a determination of an upper bound of the fastest point of the first rigid body object relative to the second rigid body object. In some implementations, the upper bound of the fastest point of the first rigid body object relative to the second rigid body object is determined using an oriented bounding box (OBB). Accordingly, the OBB may be used to determine the upper bound of a fastest point of relative motion between the first rigid body object and the second rigid body object. In some implementations, using the OBB may provide a conservative upper bound on the maximum relative velocity between any two points on either rigid body object. Accordingly, the maximum relative velocity of the OBB corners may provide an upper bound on the relative velocity of the bodies.

An oriented bounding box (OBB) may serve as a bounding volume for an object. Further, an OBB may be useful for performing calculations related to simulating motion of an object encapsulated by that OBB. The parameters of an OBB typically include a center, size, and rotation. In some implementations, when an OBB is used to determine relative velocity of the first rigid body object compared to the second rigid body object, the corners of the OBB for each body may be utilized, wherein each corner represents a vertex of the oriented bounding box.

In some implementations, calculating a velocity of an object within an OBB may be accomplished by performing the following steps. First, the global velocity of an object may be determined. The global velocity refers to the velocity of the center of mass of the object within the global coordinate system of the virtual environment. Next, the relative position of each corner of the OBB by subtracting the position of the corner in the global coordinate system from the position of the center of mass in the global coordinate system. Next, the velocity of the corner can be obtained by adding the linear velocity of the center of mass of the object to the cross product of the angular velocity of the center of mass of the object with the relative position of the corner of the OBB. Next, the steps may be repeated to obtain a velocity vector for each corner of the OBB. In this manner, the velocities of the object within the OBB may be determined with respect to the corners of the OBB.

By examining the velocities of the corners of the OBB and identifying the maximum magnitude, an upper bound on the velocity of the object within the OBB may be established. This upper bound may ensure that the object does not exceed the speed at which the corners can move within the OBB.

In some implementations, determining an upper bound for the fastest point of relative motion between the first rigid body object and the second rigid body object using OBBs may be accomplished by performing the following steps. First, the first rigid body object and the second rigid body object may each be represented by an OBB. Accordingly, the OBB for the first rigid body object may be determined using the position, orientation, and dimensions of the first rigid body object, and the OBB for the second rigid body object may be determined using the position, orientation, and dimensions of the second rigid body object. Next, the relative velocity between the OBB of the first rigid body object and the OBB of the second rigid body may be calculated by determining the difference between the velocities (e.g., linear velocity, angular velocity, etc.), of the first rigid body object and the second rigid body object. Next, the contact point on each OBB that corresponds to the fastest relative velocity may be determined with respect to the corners of each OBB. Next, the magnitude of the corner velocities between the two OBBs may be obtained by determining the pair of corners between the OBB of the first rigid body object and the OBB of the second rigid body object that have the highest relative velocity. Accordingly, the fastest contact point corresponds to the pair of corners between the OBBs with the highest relative velocity magnitude. In this manner, an upper bound of the fastest point of contact between the first and second rigid body objects may be determined by the contact points of their respective OBBs.

In some implementations, a tangential velocity at all contact points between the first and second rigid body objects is compared against a threshold tangential velocity, and based on a determination that the tangential velocity at all contact points between the first and second rigid body objects is below a threshold tangential velocity, the first and second rigid body objects may be merged.

At block 508, responsive to determining that the first rigid body object and second rigid body object are in contact, and that the relative velocity meets the threshold velocity, a merged representation that represents the first rigid body object and the second rigid body object may be constructed.

In some implementations, a collection of rigid body objects that includes at least one merged representation of rigid body objects within that collection may have fewer contact points compared to the same collection of rigid body objects that includes all individual rigid body objects that have not been merged. Accordingly, a merged representation of rigid body objects may include fewer contacts points compared to a model representation of a plurality of individual rigid body objects. For example, with reference to FIG. 3, the arrangement of the second container 330 resting on top of the first container 320 resting on top of the ship 310 may include a total of 8 contact points, where 4 contact points exist between ship 310 and the first container 320 and 4 contact points exist between the first container 320 and the second container 330. Accordingly, when the ship 310, the first container 320, and the second container 330 are each individual rigid body objects, then a set of 4 contact points may exist between the ship 310 and the first container 320, and a set of 4 contact points may exist between the first container 320 and the second container 330. Further, if the first container 320 merges with the second container 330 to form a "merged container", then only 4 contact points exist between the ship 310 and the merged container. Further, in a scenario where the first container 320 merges with the ship 310 while the second container 330 does not merge with the first container 320 but instead remains as an individual rigid body object, then only 4 contact points exist between the first container 320 and the second container 330.

In a similar manner, with reference to FIGS. 4A and 4B, when the model representation of collection of rigid body objects 440 is merged into a single merged representation 450, the contact points that ordinarily would exist between the first rigid body object 420 and the second rigid body object 430 would no longer be included in the merged representation 450 for purposes of calculation. Accordingly, the collection of rigid body objects that includes an individual first rigid body object 420 and an individual second rigid body object 430 may include 4 contact points shared between the first rigid body object 420 and the second rigid body object 430. However, when first rigid body object 420 and the second rigid body object 430 merge to form a merged representation 450, then the merged representation 450 may no longer include the 4 contact points that existed between the previously individual first rigid body object 420 and second rigid body object 430.

Block 508 may be followed by block 510. At block 510, a solver is applied based on the input state and the merged representation.

The solver may be similar to the physics solver described with reference to FIG. 2. In some implementations, applying a solver may include performing calculations to simulate motion of the merged representation. Accordingly, the solver may solve equations of motions for the merged representation. In a physics engine, a solver determines the correct physical response of rigid bodies when acted upon by an external force. More specifically, the solver performs calculations to determine a new position, orientation, and/or velocity of the merged representation of the rigid bodies when the merged representation is acted by an external force.

A solver would ordinarily also be utilized to determine (calculate) forces required to satisfy the constraints of the first rigid body object and the second rigid body object. However, since the first rigid body object and the second rigid body object have been merged, the solver may only need to solve for a single merged representation that does not include constraints between the first rigid body object and the second rigid body object to satisfy. However, in certain scenarios, the merged representation may include additional objects that are not necessarily merged together. For example, with reference to FIG. 3, in a scenario where the ship 310 has merged with the first container 320 but the first container 320 has not been merged with the second container 330, then the solver may not have any contact constraints between the ship 310 and the first container 320 to solve, but the solver may still solve for contact constraints between the first container 320 and the second container 330.

Block 510 may be followed by block 512. At block 512, an updated state for the rigid body objects is obtained by applying the solver to a set of equations constructed based on the input state and the representation, e.g., merged representation, model representation, etc. In some implementations, the updated state includes at least one of an updated position, an updated orientation, or an updated velocity for the first and the second rigid body objects.

Block 512 may be followed by block 514. At block 514, the first and the second rigid body objects in the updated state are displayed or caused to be displayed within the virtual environment. For example, the first rigid body object and the second rigid body object may be displayed on a display screen associated with a user device.

Blocks 502-514 can be performed (or repeated) in a different order than described above and/or one or more blocks can be omitted.

For example, portions of blocks 502-514 can be performed to evaluate whether a third rigid body object could be added to the merged collection. In some implementations, a plurality of rigid body objects may additionally include a third rigid body object. The evaluation could include determining whether the third rigid body object is in contact with the first rigid body object and/or the second rigid body object. For example, it may be determined whether the motions of the first rigid body object and/or the second rigid body object is coupled by a contact or constraint to a third rigid body object. If it is determined that the first rigid body object and/or the second rigid body object are in contact with the third rigid body object, it may be additionally determined whether a relative velocity of the first/second rigid body object and the third rigid body object meets the threshold velocity.

Responsive to a determination that the first/second rigid body object and the third rigid body object are not in contact or that the relative velocity of the first/second rigid body object and the third rigid body object does not meet the threshold velocity, the solver may be applied based on the input state and the model representation of the third rigid body object (without merging the third rigid body object). Subsequent to applying the solver, the third rigid body object may be displayed in the updated state within the virtual environment.

If it is determined that the first/second rigid body object and the third rigid body object are in contact and that the relative velocity of the first/second rigid body object and the third rigid body object meets the threshold velocity, a merged representation may be constructed that represents the first rigid body object, the second rigid body object, and the third rigid body object. The merged representation that represents the first rigid body object, the second rigid body object, and the third rigid body object may then be utilized for simulating the merged representation.

Figure 6:
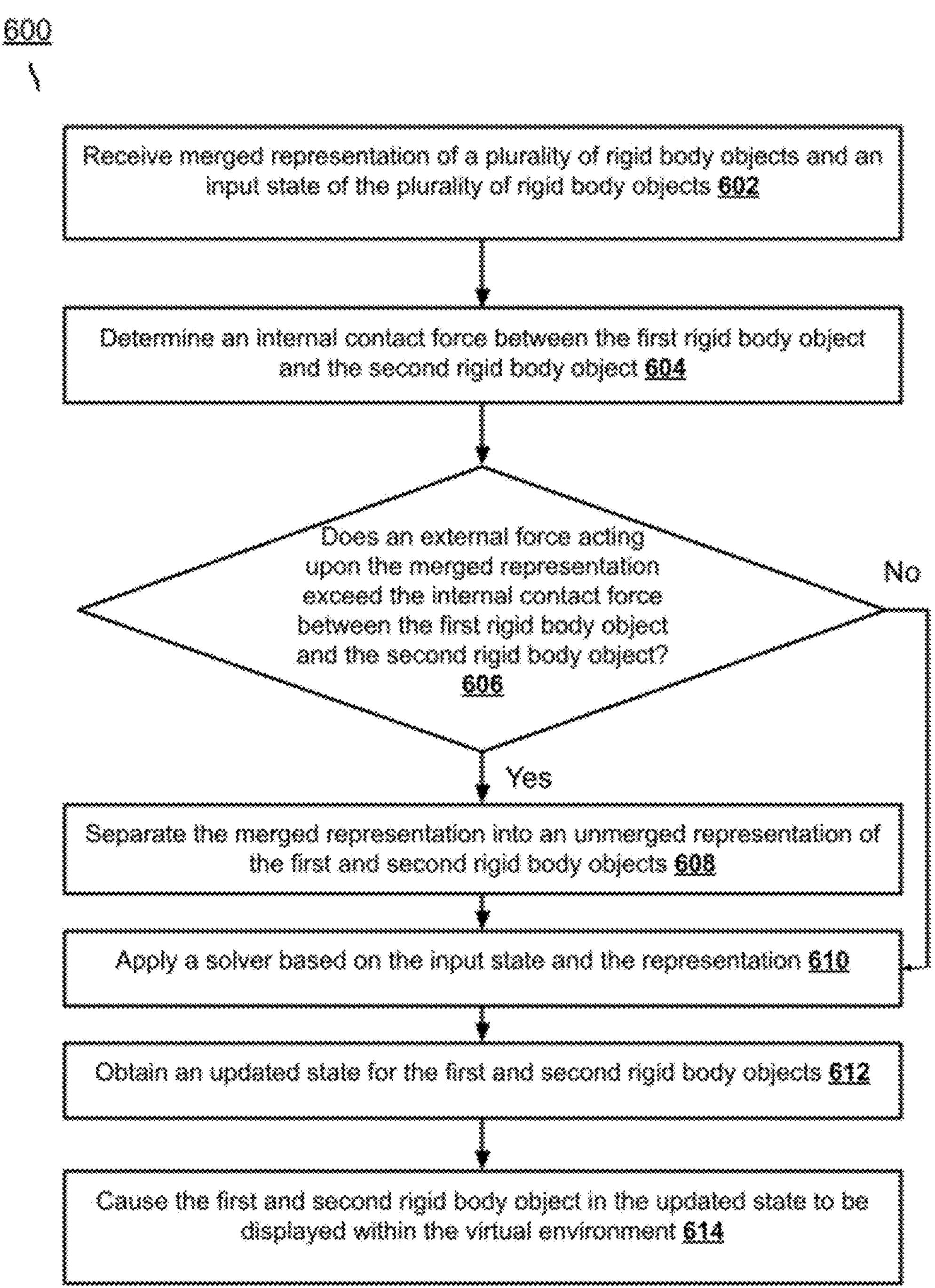
FIG. 6 is a flowchart illustrating another example method to simulate and/or display rigid body objects within a virtual environment, in accordance with some implementations.

FIG. 6 is a flowchart that illustrates another example method to simulate and/or display rigid body objects within a virtual environment, in accordance with some implementations. More particularly, FIG. 6 is a flowchart that illustrates the determination of whether to unmerge a previously merged representation of a plurality of rigid body objects. In some implementations, method 600 can be implemented, for example, on a virtual experience server 102 described with reference to FIG. 1. In some implementations, some or all of the method 600 can be implemented on one or more client devices 110 as shown in FIG. 1, on one or more developer devices 130, or on one or more server devices(s) 102, and/or or on a combination of developer device(s), server device(s) and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 600. In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device. Method 600 may begin at block 602.

At block 602, a merged representation of a plurality of rigid body objects and an input state of the plurality of rigid body objects is received.

Block 602 may be followed by block 604. At block 604, an internal force between the first rigid body object and the second rigid body object may be determined.

In some implementations, the internal forces are the normal force and friction force. In some implementations, the internal forces include constraint forces.

Block 604 may be followed by block 606. At block 606, it may be determined whether the external forces acting upon the merged representation overcome the internal forces between the first rigid body object and second rigid body object and cause them to move relative to one another. Upon a determination that the external forces overcome the internal force, block 606 may be followed by block 608; else block 606 may be followed by block 610.

In some implementations, an approximate solve of the equations of motion, e.g., by performing just a few iterations of projected Gauss Seidel, may be utilized to determine the internal force. In these implementations, the determination of whether a body is to be unmerged may be based on updated velocities determined using the constraint/contact forces computed by this approximate solve of the equations of motion. At block 608, the merged representation may be separated into an unmerged representation that represents an individual first rigid body object and an individual second rigid body object.

Block 608 may be followed by block 610. At block 610, a solver is applied based on the input state and the unmerged representation.

The solver may be similar to the solver described with reference to FIG. 2. In some implementations, applying the solver may include performing calculations to simulate motion of bodies included in the unmerged representation. Accordingly, the solver may solve equations of motions for the unmerged representation. In a physics engine, the solver determines the correct physical response of rigid bodies when acted upon by an external force. More specifically, the solver performs calculations to determine a new position, orientation, and/or velocity of the unmerged representation when the unmerged representation is acted upon by an external force.

Block 610 may be followed by block 612. At block 612, an updated state for the first and second rigid body objects may be obtained. In some implementations, the updated state includes an updated position, an updated orientation, and/or an updated velocity for the first and the second rigid body object.

Block 612 may be followed by block 614. At block 614, the first and second rigid body object in the updated state may be displayed within the virtual environment.

Blocks 602-614 can be performed (or repeated) in a different order than described above and/or one or more steps can be omitted.

In some implementations, blocks 602-604 may be performed conditionally. For example, in some scenarios, the determination to unmerge collections of bodies can add a computational overhead to the simulation, e.g., due to the computational overhead introduced by the approximate solver used to estimate the velocities of individual bodies within a collection. In certain cases, e.g., for a collection of bodies that include a relatively small number of bodies that are merged to form the collection, the overhead can overwhelm the benefit accruing from merging the rigid bodies.

In some implementations, the approximate solve is performed when a sufficiently large number of bodies/constraints/collisions have been merged together and may otherwise not be performed (or performed selectively based on available computational capacity). In such a scenario, when the approximate solve is not performed, rigid bodies can be added and removed from a merged collection by performing a comparison of the relative velocities computed during the solve used to update positions and velocities between timesteps. At this stage, the cost of this solve is not reduced since the merged collections are not replaced with a single merged body; however, the overhead of unmerging bodies is relatively small.

Once a threshold number of rigid body objects have been merged together, the collection is replaced by a single merged body and an approximate solve is performed to make a determination to unmerge the bodies. Thus, the overhead (of the approximate solve) is incurred only under conditions where the overall simulation cost is reduced, providing a technical advantage of lower overall computational cost.

Some implementations may include selective performance of detection. For example, prior to replacing a merged collection of bodies with a single body, collision data is only updated for bodies that were already in contact, since bodies in the same collection move only slightly between simulation steps. A periodic check for new collisions that could be produced by numerical drift is performed, but this introduces only a small computational overhead. Selective performance of detection can also provide a technical advantage of lower overall computational cost.

In some implementations, the internal forces between two or more rigid body objects may be updated during the solve stage of the pipeline. In some implementations, the internal forces may be iteratively determined. In some implementations, the internal forces may be determined by applying about 20 iterations of projected Gauss-Seidel (PGS) to the corresponding constraint equations.

In some implementations, these internal forces may be approximated using a single iteration of the PGS solver. In some implementations, the result of a single PGS iteration may be used to evaluate the contact state between two or more rigid body objects. This can enable determination of a contact state between two or more rigid body objects without having to perform multiple iterations of the PGS solver and provide technical advantages such as reduced computational cost, faster simulation times, etc. Further, if the result of single PGS iteration indicates that a body is separating from or sliding relative to the merged collection, the body may be unmerged from the merged collection prior to the solve stage of the pipeline. In some implementations, other suitable approximation techniques may be used to evaluate the contact state between rigid body objects.

In some implementations, a post-stabilization step may be performed within the single iteration of the PGS solver that is utilized to determine whether one or more bodies from a merged collection of rigid bodies should unmerge. Performing the post-stabilization step can enable greater accuracy in some scenarios. For example, in a scenario where a tower of blocks has been merged together (e.g., via relative sleeping), a slow moving body that is brought in contact with the middle block of the tower may pass completely though the tower. This can occur since if the velocity of the incoming body is below the velocity threshold required to trigger unmerging, the slow-moving body is simulated such that it continues to move into the stack of blocks, and eventually passes completely through the tower of blocks.

To mitigate such effects, in some implementations, a single iteration of the PGS solver is applied to a post-stabilization linear complementarity problem (LCP) system that is constructed based on the system of equations. The post-stabilization LCP system is similar to an LCP system that governs the dynamics of the constrained bodies. However, the right-hand-side of the constructed post-stabilization LCP system in this case is set to be equal to the constraint violation for each constraint of a plurality of constraints. A solution to the thus constructed LCP provides updates to the positions and orientations of the bodies required to resolve the constraint violation(s).

The position and orientation updates obtained via a solution to the LCP system is utilized in the unmerging process; rigid bodies are unmerged based on a determination that their relative position and/or orientation changes (updates) meet a predetermined threshold, e.g., are above a specified tolerance. For example, in the scenario of the slow moving body approaching the tower of blocks, when the penetration of the slow-moving body through the tower meets the predetermined threshold (e.g., is large enough), an unmerge event is triggered, thereby preventing an unphysically large penetration. The post-stabilization described herein can ensure accurate unmerging of rigid bodies in a collection and is more robust when compared to other techniques such as relying upon Baumgarte feedback, which may require careful tuning to provide accurate results.

In some embodiments, unmerging includes contact ordering for improved graph traversal of the internal forces between bodies in a merged collection, which may improve the identification of all the bodies to be unmerged from a merged collection, e.g., when acted upon by an external force.

Further performance improvements may be achieved by optimizing the manner of forming the system of equations that are to be solved at each step of the simulation to determine whether merged rigid body objects are to be unmerged. In some implementations, the equations describing the motion of constrained rigid body objects may include the calculation of Jacobian matrices.

A Jacobian matrix (also referred to simply as a "Jacobian") collects first-order partial derivatives of a multivariable function. Accordingly, the Jacobian matrix is a mathematical representation that may be used to describe the relationship between the velocities of rigid body objects and their constraint violations.

The Jacobian matrix may provide information about how changes in the generalized coordinates of rigid body objects in the virtual environment affect the constraint violations. By multiplying the Jacobian matrix by the vector of generalized velocities, the vector of constraint violations may be obtained. Accordingly, constraint violations are determined by the product of the Jacobian matrix and the generalized velocities. The Jacobian matrix may describe how changes in the configuration of the system of rigid body objects affect the constraint violations. Accordingly, the Jacobian matrix may relate the velocities of rigid body objects in a system to the constraint violations imposed on those rigid body objects. Accordingly, constraint Jacobians describe the relation between rigid body object velocities and constraint violations. Further, the constraint Jacobians describe the effect that a movement of one body will have on another body. Further, the constraint Jacobians may describe the transformation between the motion of one body and another body via a constraint.

The calculation of the Jacobians may be computationally expensive in scenarios where a large number of constraints are present in the system. However, once two rigid body objects are merged, the Jacobians of the constraints may not need to be recomputed once the bodies have merged.

In some implementations, the constraint Jacobian matrices may be stored in cache memory. Accordingly, most constraint Jacobian matrices (constraint Jacobians) within a collection of merged rigid body objects subsequently may not need to be re-computed. Caching the constraint Jacobians may further reduce the computational expense of simulating systems of comoving rigid body objects.

For example, at a time of constructing a merged representation that represents the first rigid body object and the second rigid body object, a constraint matrix may be determined based on a relation between the relative velocity between the first rigid body object, the second rigid body object, and one or more constraints. At the time of construction of the merged representation, the constraint matrix associated with the merged representation that represents the first rigid body object and the second rigid body object may be stored in a cache memory.

At a subsequent time, e.g., at a time of separation of the merged representation into the unmerged representation that represents the first rigid body object and the second rigid body object, the constraint matrix may be retrieved from the cache memory. The solver may be applied based on the input state, the constraint matrix, and the unmerged representation to determine a state of relative motion between the first rigid body object and the second rigid body object. In some implementations, the state of relative motion between the first rigid body object and the second rigid body object may be utilized during subsequent timesteps of the simulation to determine whether the first rigid body object and second rigid body object move relative to one another.

Overdetermined problems may frequently exist in rigid body object simulation. As an illustrative example, the following scenario is considered: a door with three hinges, where two of the hinges may be redundant. Overdetermined problems may result in numerical challenges for rigid body simulators. In some implementations, a regularization term or function may be provided into the equations of motion to ultimately provide a unique solution for the equations of motion.

Constrained rigid bodies and/or rigid bodies that are in contact with other rigid bodies commonly include redundant constraints. For example, a chair with four legs resting on the ground has an extra (redundant) contact: only three contact points are sufficient in this case to ensure that the sum of the forces and torques on the chair is zero. With four perfectly rigid contact points, there are many values (theoretically infinite) for solutions for the contact forces that result in a zero net force/torque solution. This is a consequence of the fact that the system of equations describing these contact forces has a non-trivial null space.

Since there are infinitely many solutions, simulating these equations with an approximate solver in finite precision arithmetic can cause the solution to fluctuate. Any numerical noise contributed by computational floating point arithmetic and/or incomplete convergence can be amplified and may cause the solution to drift between simulation steps.

In some implementations, to overcome this issue, a regularization (term) is added to the diagonal of the matrix system, which eliminates the non-trivial null space. With the addition of the regularization, the system of equations has only a single true solution, and this prevents the fluctuation of the numerical solution. The solution to the system of equations depends on the choice of regularization values; different regularization values may lead to different solutions.

In some implementations, without consistent constraint regularization, the internal forces computed by the simulator may fluctuate rapidly. Further, in the context of relative sleeping, these fluctuations may cause undesired behavior, e.g., frequent merging and unmerging of rigid body objects. Accordingly, the inclusion of a consistent regularization for use in determining whether to unmerge rigid bodies may be beneficial in preventing undesired unmerging.

In some implementations, the regularization used when determining whether rigid body objects should unmerge is stored in cache memory. In some implementations, the same regularization is applied when solving for the velocities of merged body objects. Providing a consistent regularization and applying the same regularization when solving for the velocities of merged bodies may produce stable internal forces, irrespective of the regularization formulation used by the solver.

For constraints/contacts that are not internal to a merged collection of bodies (not between two rigid bodies in the collection), an initial guess for their force values may be utilized from the full solve, i.e., the solve performed to update the velocities and positions of bodies, both merged and not merged, from one time step to the next time step. Since the regularization values are important parameters utilized to determine the solution to the system of equations, it is important that these regularization values are consistent between the full solve and the approximate solve utilized to determine whether rigid bodies in a collection are to be unmerged. Inconsistency in the regularization value can cause the forces to fluctuate and can cause bodies to be unmerged prematurely.

The Newton-Euler equations that describe the constrained dynamics of rigid bodies may be integrated in time using either an explicit or implicit integration scheme. In the case of an implicit scheme, the equations of motion are nonlinear. In some implementations, Newton's method may be used to solve these nonlinear equations, which proceeds by first linearizing the equations of motion. A first-order explicit scheme or implicit scheme which has been linearized both produce a linear system of the form:

$$\begin{bmatrix} H & -J^T \\ J & C \end{bmatrix} \begin{bmatrix} \Delta u \\ h\Delta\lambda \end{bmatrix} = -\begin{bmatrix} r_u \\ r_\lambda \end{bmatrix}$$

where H is the mass block matrix, J is the constraint Jacobian block matrix, C is the compliance block matrix, $\Delta u$ is the velocity update vector, $\Delta\lambda$ is the constraint force update vector, h is the timestep, and $r_u$ and $r_\lambda$ are the velocity and force residuals, respectively. For contact constraints between a pair of rigid bodies, the complementarity conditions ensure that either a) the two bodies are not in contact and that there is no contact force, or that b) the bodies are in contact and there is a contact force:

$$0 \leq \phi \perp \lambda_n \geq 0,$$

where Φ is a gap function that measures the distance between the closest points of two bodies and $\lambda_n$ is the constraint force in the surface normal direction of the contact. If a Coulomb friction law is assumed, the magnitude of the tangential contact force and the normal contact force is given by $$\|\lambda_t\| \leq \mu\lambda_n,$$

where $\|\lambda_t\|$ is the magnitude of the tangential components of the contact force and λ is the coefficient of friction. To reduce the computational cost of solving this system, the size of the system can be reduced by taking the Schur-complement with respect to either the mass block (resulting in the dual formulation) or with respect to the compliance block (resulting in the primal formulation). In the dual formulation, the constraint force updates are first solved for, and then the velocity updates are computed:

$$[JH^{-1}J^T + C]\Delta\lambda = \frac{1}{h}(JH^{-1}r_u - r_\lambda),$$

$$\Delta u = H^{-1}(hJ^T\Delta\lambda - r_u).$$

In the primal formulation, the velocity updates are solved for, and the impulse updates are computed from the velocity updates:

$$[H + J^T C^{-1} J]\Delta u = -r_u - (J^T C^{-1} r_\lambda),$$

$$\Delta\lambda = \frac{1}{h}C^{-1}(-J\Delta u - r_u).$$

In the dual formulation, the internal constraint forces/are cached following the single iteration of PGS used to determine whether bodies should unmerge. In the primal formulation, the velocities of the bodies that have been merged are cached after the single PGS iteration. In either case, these cached values are used as an initial guess in subsequent solves, which improves the convergence of the PGS iteration, thereby improving the accuracy of velocities used to determine whether bodies should unmerge.

Techniques of this disclosure, e.g., relative sleeping, can provide significant computational savings, and improve the performance of computer system(s) utilized to simulate and display rigid bodies in a virtual environment. Adaptive merging can also be utilized to reduce the amount of network traffic in a distributed computer system where different nodes simulate different rigid body objects in the virtual environment.

A general computer network can include an undirected graph of connected nodes, each of which may be responsible for simulating a particular collection of rigid body objects. Each node may refer to another computer, processor, computing instance, etc., that is utilized to perform a portion of the simulation, e.g., by applying a physics solver.

In a typical distributed computer system, one node (e.g., a first computer node) is utilized to simulate the dynamics (motion, position, orientation, etc.) of a set of rigid bodies, which then transmits updated positions and velocities of each rigid body of the set of rigid bodies to other computer nodes, where they can be rendered locally for display by each other node.

When relative sleeping is not utilized, the positions and velocities of each individual rigid body are transmitted to each node at each synchronization step, which occurs frequently. With the utilization of relative sleeping (adaptive merging), relative positions/orientations of rigid bodies within a merged collection can be transmitted (from the first node to the other nodes) once at the time of merging. At each subsequent synchronization step, only the position/orientation and velocity of the merged collection of bodies is broadcast to other nodes, thus saving communication costs.

At the other nodes, the position/orientation and velocity of the bodies within a merged collection can then be reconstructed using the relative position/orientation received initially (at the time of the merging of rigid bodies) and the updated position/orientation and velocity of the merged collection that is received at each subsequent time step. This can reduce the network bandwidth required to update rigid body positions/orientations and velocities of a set of rigid bodies. For example, if 100 bodies, e.g., a stack of 100 containers, are merged, the bandwidth can be reduced by roughly a factor of 100.

In some implementations, the workflow for updating rigid body positions/orientations at a second node based on a first node may be realized as follows. At the second node, an indication may be received from a first node at a first time that the first rigid body object and the second rigid body object are included in a merged representation. The indication may include a relative position and orientation of each of the first rigid body object and the second rigid body object.

At a subsequent time, an updated consolidated state of the first rigid body object and the second rigid body object may be received at the second node. The updated consolidated state can include a relative position and orientation of a consolidated object that is representative of the first rigid body object and the second rigid body object.

Based on the relative position and orientation of each of the first rigid body object and the second rigid body object and the updated consolidated state, an updated position of each of the first rigid body object and the second rigid body object may be determined at the second node. The first rigid body object and the second rigid body object can be displayed (or caused to be displayed) within a virtual environment at the second node.

Additionally, when one or more rigid body objects are unmerged from a collection of rigid body objects, an indication may be provided to that effect from a first node to one or more other nodes (e.g., a second node).

Figure 7:
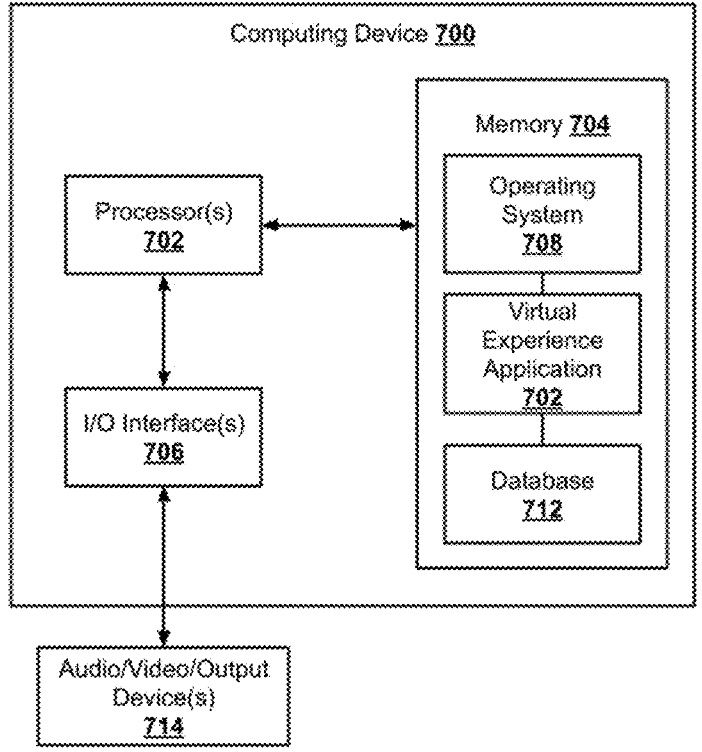
FIG. 7 depicts an example computing device, in accordance with some implementations.

FIG. 7 is a block diagram of an example computing device 700 which may be used to implement one or more features described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application and application data 712. In some implementations, application 710 can include instructions that enable processor 702 to perform the functions (or control the functions of) described herein, e.g., some or all of the methods described with respect to FIGS. 5 and 6.

For example, applications 710 can include an audio spatialization module 712, which as described herein can provide audio spatialization within an online virtual environment server (e.g., 102). Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks of operating system 708 and virtual environment application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online virtual environment server 102 is described as performing operations as described in some implementations herein, any suitable component or combination of components of online virtual environment server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500, 600, etc.) can be implemented by computer program instructions or code, which can be executed on a computer, or a set of computer nodes (e.g., compute instances, processors, etc.) in a distributed computing system. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

Embodiments have been described, as required by statute, to be illustrative, but should not be interpreted to be restrictive. One having skill in the art will recognize that many different arrangements of the various components depicted are possible without departing from the scope of the claims below, as well as arrangements including components not explicitly shown.

One having skill in the art will understand that certain combinations and/or sub-combinations of elements and features are of utility and may be employed without reference to other combinations and/or sub-combinations and are contemplated within the scope of the claims. Not all steps listed in the various figures need be carried out in the specific order described.

Accordingly, the scope of the disclosure expressly should not be limited to such example embodiments illustrating some possible non-limiting combination of features that may exist alone or in other combinations of features; the scope being defined by the claims appended hereto.

What is claimed is:

1. A computer-implemented method to display a plurality of rigid body objects within a virtual environment, the method comprising:

receiving a model representation of the plurality of rigid body objects, wherein the plurality of rigid body objects comprises at least a first rigid body object and a second rigid body object;

receiving an input state of the plurality of rigid body objects represented by the model representation;

determining that the first rigid body object and the second rigid body object are in contact;

determining that a relative velocity between the first rigid body object and the second rigid body object meets a threshold velocity;

responsive to determining that the first rigid body object and the second rigid body object are in contact and that the relative velocity between the first rigid body object and the second rigid body object meets the threshold velocity, constructing a merged representation that represents at least the first rigid body object and the second rigid body object;

determining a number of rigid body objects included in the merged representation;

if it is determined that the number of rigid body objects included in the merged representation meets a threshold number of rigid body objects, applying a solver based on the input state and the merged representation to obtain an updated state for the first rigid body object and the second rigid body object, wherein the updated state includes at least one of: an updated position, an updated orientation, or an updated velocity for the first rigid body object and the second rigid body object; and if it is determined that the number of rigid body objects included in the merged representation does not meet the threshold number of rigid body objects, applying a solver based on the input state and the model representation to obtain an updated state for the first rigid body object and the second rigid body object, wherein the updated state includes at least one of: an updated position, an updated orientation, or an updated velocity for the first rigid body object and the second rigid body object; and causing the first rigid body object and the second rigid body object in the updated state to be displayed within the virtual environment.

2. The computer-implemented method of claim 1, wherein the plurality of rigid body objects further comprises a third rigid body object, and wherein the method further comprises:

determining whether the third rigid body object is in contact with the first rigid body object;

if it is determined that the first rigid body object and the third rigid body object are in contact, determining whether a relative velocity of the first rigid body object and the third rigid body object meets the threshold velocity;

responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and the third rigid body object are in contact and that the relative velocity of the first rigid body object and the third rigid body object meets the threshold velocity, constructing the merged representation that represents the first rigid body object, the second rigid body object, and the third rigid body object.

3. The computer-implemented method of claim 1, further comprising:

responsive to a determination that the first rigid body object and the second rigid body object are in contact, determining a contact state between the first rigid body object and the second rigid body object, wherein the contact state comprises a set of contact points between the first rigid body object and the second rigid body object; and determining whether a tangential velocity for each contact point meets a threshold tangential velocity; and responsive to determining that the first rigid body object and the second rigid body object are in contact, that the relative velocity meets the threshold velocity, and that the tangential velocity of each contact point meets the threshold tangential velocity, constructing the merged representation.

4. The computer-implemented method of claim 1, wherein determining that the first rigid body object and the second rigid body object are in contact comprises determining at least one constraint between the first rigid body object and the second rigid body object.

5. The computer-implemented method of claim 1, further comprising:

determining whether one or more external forces acting on the merged representation overcome an internal force between the first rigid body object and the second rigid body object; and responsive to a determination that the one or more external forces overcomes the internal force, separating the merged representation into an unmerged representation that represents the first rigid body object and the second rigid body object, and applying the solver based on the input state and the unmerged representation to obtain the updated state for the first rigid body object and the second rigid body object.

6. The computer-implemented method of claim 5, further comprising:

determining a constraint matrix based on a relation between the relative velocity between the first rigid body object and the second rigid body object, and at least one constraint;

storing, at a time of constructing the merged representation that represents the first rigid body object and the second rigid body object, the constraint matrix in a cache memory;

retrieving, subsequent to a time of separation of the merged representation into the unmerged representation that represents the first rigid body object and the second rigid body object, the constraint matrix from the cache memory; and applying the solver based on the input state, the constraint matrix, and the unmerged representation to determine a state of relative motion between the first rigid body object and the second rigid body object.

7. The computer-implemented method of claim 5, further comprising providing a regularization function to determine a stable internal force between the first rigid body object and the second rigid body object.

8. The computer-implemented method of claim 7, further comprising storing the regularization function applied to the internal force in a cache memory, and retrieving the regularization function from the cache memory for determining the updated state of the merged representation.

9. The computer-implemented method of claim 7, further comprising providing the regularization function to determine the updated state of the merged representation.

10. The computer-implemented method of claim 1, wherein the model representation of each rigid body object of the plurality of rigid body objects is a respective mesh, and wherein determining that the first rigid body object and the second rigid body object are in contact comprises determining a state of the first rigid body object and the second rigid body object with reference to surfaces of the respective mesh of the first rigid body object and the second rigid body object.

11. The computer-implemented method of claim 1, wherein determining that the relative velocity between the first rigid body object and the second rigid body object meets the threshold velocity comprises providing an oriented bounding box (OBB) to determine an upper bound of a fastest point of relative motion between the first rigid body object and the second rigid body object.

12. The computer-implemented method of claim 1, wherein determining that the first rigid body object and the second rigid body object are in contact comprises determining that the first rigid body object and the second rigid body object are in a state of direct contact.

13. The computer-implemented method of claim 1, wherein a first computational cost of applying the solver based on the input state and the merged representation is lower than a second computational cost of applying the solver based on the input state and the model representation.

14. The computer-implemented method of claim 1, wherein applying the solver based on the input state and the merged representation is performed at a first computer node, and wherein the method further comprises:

receiving, at a second computer node and from the first computer node, an indication at a first time that the first rigid body object and the second rigid body object are included in the merged representation, wherein the indication includes a relative position and orientation of the first rigid body object and the second rigid body object;

receiving, at the second computer node and from the first computer node, at a subsequent time, an updated consolidated state of the first rigid body object and the second rigid body object, wherein the updated consolidated state includes a relative position and orientation of a consolidated object that is representative of both the first rigid body object and the second rigid body object;

determining, at the second computer node, an updated position of each of the first rigid body object and the second rigid body object based on the relative position and orientation of the first rigid body object and the second rigid body object at the first time, and the updated consolidated state; and causing the first rigid body object and the second rigid body object in the updated state to be displayed at the second computer node.

15. A system comprising:

a memory with instructions stored thereon; and a processing device, coupled to the memory, the processing device configured to access the memory and execute the instructions, wherein the instructions cause the processing device to perform operations comprising:

receiving a model representation of a plurality of rigid body objects, wherein the plurality of rigid body objects comprises at least a first rigid body object and a second rigid body object;

receiving an input state of the plurality of rigid body objects represented by the model representation;

determining that the first rigid body object and the second rigid body object are in contact;

determining that a relative velocity between the first rigid body object and the second rigid body object meets a threshold velocity;

responsive to determining that the first rigid body object and the second rigid body object are in contact and that the relative velocity between the first rigid body object and the second rigid body object meets the threshold velocity, constructing a merged representation that represents at least the first rigid body object and the second rigid body object;

determining a number of rigid body objects included in the merged representation;

if it is determined that the number of rigid body objects included in the merged representation meets a threshold number of rigid body objects, applying a solver based on the input state and the merged representation to obtain an updated state for the first rigid body object and the second rigid body object, wherein the updated state includes at least one of: an updated position, an updated orientation, or an updated velocity for the first rigid body object and the second rigid body object; and if it is determined that the number of rigid body objects included in the merged representation does not meet the threshold number of rigid body objects, applying a solver based on the input state and the model representation to obtain an updated state for the first rigid body object and the second rigid body object, wherein the updated state includes at least one of: an updated position, an updated orientation, or an updated velocity for the first rigid body object and the second rigid body object; and causing the first rigid body object and the second rigid body object in the updated state to be displayed within a virtual environment.

16. The system of claim 15, wherein the plurality of rigid body objects further comprises a third rigid body object, and wherein the operations further comprise:

determining whether the third rigid body object is in contact with the first rigid body object;

if it is determined that the first rigid body object and the third rigid body object are in contact, determining whether a relative velocity of the first rigid body object and the third rigid body object meets the threshold velocity;

responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and the third rigid body object are in contact and that the relative velocity of the first rigid body object and the third rigid body object meets the threshold velocity, constructing the merged representation that represents the first rigid body object, the second rigid body object, and the third rigid body object.

17. The system of claim 15, wherein the operations further comprise:

responsive to a determination that the first rigid body object and the second rigid body object are in contact, determining a contact state between the first rigid body object and the second rigid body object, wherein the contact state comprises a set of contact points between the first rigid body object and the second rigid body object; and determining whether a tangential velocity for each contact point meets a threshold tangential velocity; and responsive to determining that the first rigid body object and the second rigid body object are in contact, that the relative velocity meets the threshold velocity, and that the tangential velocity of each contact point meets the threshold tangential velocity, constructing the merged representation.

18. The system of claim 15, wherein determining that the first rigid body object and the second rigid body object are in contact comprises determining at least one constraint between the first rigid body object and the second rigid body object.

19. The system of claim 15, wherein the model representation of each rigid body object of the plurality of rigid body objects is a respective mesh, and wherein determining that the first rigid body object and the second rigid body object are in contact comprises determining a state of the first rigid body object and the second rigid body object with reference to surfaces of the respective mesh of the first rigid body object and the second rigid body object.

20. The system of claim 15, wherein determining that the first rigid body object and the second rigid body object are in contact comprises determining that the first rigid body object and the second rigid body object are in a state of direct contact.

21. The system of claim 15, wherein determining that the first rigid body object and the second rigid body object are in contact comprises determining that the first rigid body object and the second rigid body object are connected by a constraint.

22. The system of claim 15, wherein applying the solver based on the input state and the merged representation is performed at a first computer node, and wherein the operations further comprise:

receiving, at a second computer node and from the first computer node, an indication at a first time that the first rigid body object and the second rigid body object are included in the merged representation, wherein the indication includes a relative position and orientation of each of the first rigid body object and the second rigid body object;

receiving, at the second computer node and from the first computer node, at a subsequent time, an updated consolidated state of the first rigid body object and the second rigid body object, wherein the updated consolidated state includes a relative position and orientation of a consolidated object that is representative of both the first rigid body object and the second rigid body object;

determining, at the second computer node, an updated position of each of the first rigid body object and the second rigid body object based on the relative position and orientation of each of the first rigid body object and the second rigid body object at the first time and the updated consolidated state; and causing the first rigid body object and the second rigid body object in the updated state to be displayed within the virtual environment at the second computer node.

23. A non-transitory computer-readable medium comprising instructions that, responsive to execution by a processing device, cause the processing device to perform operations comprising:

receiving a model representation of a plurality of rigid body objects, wherein the plurality of rigid body objects comprises at least a first rigid body object and a second rigid body object;

receiving an input state of the plurality of rigid body objects represented by the model representation;

determining that the first rigid body object and the second rigid body object are in contact;

determining that a relative velocity between the first rigid body object and the second rigid body object meets a threshold velocity;

responsive to determining that the first rigid body object and the second rigid body object are in contact and that the relative velocity between the first rigid body object and the second rigid body object meets the threshold velocity, constructing a merged representation that represents at least the first rigid body object and the second rigid body object;

determining a number of rigid body objects included in the merged representation;

if it is determined that the number of rigid body objects included in the merged representation meets a threshold number of rigid body objects, applying a solver based on the input state and the merged representation to obtain an updated state for the first rigid body object and the second rigid body object, wherein the updated state includes at least one of: an updated position, an updated orientation, or an updated velocity for the first rigid body object and the second rigid body object; and if it is determined that the number of rigid body objects included in the merged representation does not meet the threshold number of rigid body objects, applying a solver based on the input state and the model representation to obtain an updated state for the first rigid body object and the second rigid body object, wherein the updated state includes at least one of: an updated position, an updated orientation, or an updated velocity for the first rigid body object and the second rigid body object; and causing the first rigid body object and the second rigid body object in the updated state to be displayed within a virtual environment.

24. The non-transitory computer-readable medium of claim 23, wherein the plurality of rigid body objects further comprises a third rigid body object, and wherein the operations further comprise:

determining whether the third rigid body object is in contact with the first rigid body object;

if it is determined that the first rigid body object and the third rigid body object are in contact, determining whether a relative velocity of the first rigid body object and the third rigid body object meets the threshold velocity;

responsive to determining that the first rigid body object and the third rigid body object are not in contact or that the relative velocity of the first rigid body object and the third rigid body object does not meet the threshold velocity, applying the solver based on the input state and the model representation of the third rigid body object; and causing the third rigid body object in the updated state to be displayed within the virtual environment; and responsive to determining that the first rigid body object and the third rigid body object are in contact and that the relative velocity of the first rigid body object and the third rigid body object meets the threshold velocity, constructing the merged representation that represents the first rigid body object, the second rigid body object, and the third rigid body object.

25. The non-transitory computer-readable medium of claim 23, wherein determining that the first rigid body object and the second rigid body object are in contact comprises determining at least one constraint between the first rigid body object and the second rigid body object.

26. The non-transitory computer-readable medium of claim 23, wherein determining that the relative velocity between the first rigid body object and the second rigid body object meets the threshold velocity further comprises providing an oriented bounding box (OBB) to determine an upper bound of a fastest point of relative motion between the first rigid body object and the second rigid body object.

27. The non-transitory computer-readable medium of claim 23, wherein determining that the first rigid body object and the second rigid body object are in contact comprises determining that the first rigid body object and the second rigid body object are in a state of direct contact.

28. The non-transitory computer-readable medium of claim 23, wherein determining that the first rigid body object and the second rigid body object are in contact comprises determining that the first rigid body object and the second rigid body object share a constraint.

29. The non-transitory computer-readable medium of claim 23, wherein applying the solver based on the input state and the merged representation is performed at a first computer node, and wherein the operations further comprise:

receiving, at a second computer node and from the first computer node, an indication at a first time that the first rigid body object and the second rigid body object are included in the merged representation, wherein the indication includes a relative position and orientation of each of the first rigid body object and the second rigid body object;

receiving, at the second computer node and from the first computer node, at a subsequent time, an updated consolidated state of the first rigid body object and the second rigid body object, wherein the updated consolidated state includes a relative position and orientation of a consolidated object that is representative of both the first rigid body object and the second rigid body object;

determining, at the second computer node, an updated position of each of the first rigid body object and the second rigid body object based on the relative position and orientation of each of the first rigid body object and the second rigid body object at the first time and the updated consolidated state; and causing the first rigid body object and the second rigid body object in the updated state to be displayed within the virtual environment at the second computer node.

* * * * *